(12) United States Patent
Weiner

(10) Patent No.: US 9,830,594 B2
(45) Date of Patent: Nov. 28, 2017

(54) SYSTEM AND METHOD FOR PERFORMING A SECURE TRANSACTION

(75) Inventor: Avish Jacob Weiner, Tel Aviv (IL)

(73) Assignee: Ping Identity Corporation, Denver, CO (US)

( * ) Notice: Subject to any disclaimer, the term of this patent is extended or adjusted under 35 U.S.C. 154(b) by 595 days.

(21) Appl. No.: 14/118,232

(22) PCT Filed: May 16, 2012

(86) PCT No.: PCT/IL2012/050178
§ 371 (c)(1),
(2), (4) Date: Nov. 17, 2013

(87) PCT Pub. No.: WO2012/156977
PCT Pub. Date: Nov. 22, 2012

(65) Prior Publication Data
US 2014/0067509 A1 Mar. 6, 2014

Related U.S. Application Data

(60) Provisional application No. 61/486,866, filed on May 17, 2011.

(51) Int. Cl.
*G06Q 30/02* (2012.01)
*G06Q 20/38* (2012.01)
(Continued)

(52) U.S. Cl.
CPC ....... *G06Q 20/382* (2013.01); *G06Q 20/3224* (2013.01); *G06Q 20/3278* (2013.01);
(Continued)

(58) Field of Classification Search
CPC .................. G06Q 30/0241; G06C 30/0207
(Continued)

(56) References Cited

U.S. PATENT DOCUMENTS 5,420,606 A 5/1995 Begum et al.
5,559,961 A 9/1996 Blonder
(Continued)

FOREIGN PATENT DOCUMENTS

CN 1533088 A 9/2004
CN 101583968 A 11/2009
(Continued)

OTHER PUBLICATIONS

Dan Balaban, "Pioneering NFC Service Provider Adds Bar Codes to New NFC Trial", available on May 8, 2010, retrieved from http://www.nfctimes.com/news/pioneering-nfc-service-provider-adds-bar-codes-new-nfc-trial, referred to hereinafter as Balaban.*
(Continued)

*Primary Examiner* — Sam Refai

(57) ABSTRACT

A secure transaction system constituted of: a two dimensional platform arranged for variable display; at least one antenna arranged to receive a signal from a contactless element, each of the at least one antenna secured at a fixed location on the two dimensional platform; a transaction server; and a poster communication device in communication with each of the at least one antenna and with the transaction server, the poster communication device arranged to read an identifier of a contactless element juxtaposed with a particular one of the at least one antenna, and transmit the read contactless element identifier and identification information associated with the particular antenna to the transaction server.

19 Claims, 11 Drawing Sheets

(51) Int. Cl.
*G06Q 20/32* (2012.01)
*G06Q 20/42* (2012.01)

(52) U.S. Cl.
CPC ......... *G06Q 20/387* (2013.01); *G06Q 20/425* (2013.01); *G06Q 30/0215* (2013.01); *G06Q 30/0224* (2013.01); *G06Q 30/0241* (2013.01)

(58) Field of Classification Search
USPC .......................................... 705/14.1–14.73
See application file for complete search history.

(56) References Cited

U.S. PATENT DOCUMENTS

| | | |
|---|---|---|
| 5,875,394 A | 2/1999 | Daly et al. |
| 5,892,900 A | 4/1999 | Ginter et al. |
| 5,903,721 A | 5/1999 | Sixtus |
| 5,991,407 A | 11/1999 | Murto |
| 6,082,620 A | 7/2000 | Bone, Jr. |
| 6,338,140 B1 | 1/2002 | Owens et al. |
| 6,510,502 B1 | 1/2003 | Shimizu |
| 6,584,309 B1 | 6/2003 | Whigham |
| 6,687,346 B1 | 2/2004 | Swartz et al. |
| 6,705,517 B1 | 3/2004 | Zajkowski et al. |
| 7,028,906 B2 | 4/2006 | Challa et al. |
| 7,137,006 B1 | 11/2006 | Grandcolas et al. |
| 7,347,361 B2 | 3/2008 | Lovett |
| 7,356,510 B2 | 4/2008 | Durand et al. |
| 7,392,226 B1 | 6/2008 | Sasaki et al. |
| 7,509,119 B2 | 3/2009 | Eonnet |
| 7,529,710 B1 | 5/2009 | Clower et al. |
| 7,706,784 B2 | 4/2010 | Weiner et al. |
| 7,774,231 B2 | 8/2010 | Pond et al. |
| 7,962,762 B2 | 6/2011 | Kirsch et al. |
| 8,108,318 B2 | 1/2012 | Mardikar |
| 8,185,956 B1 | 5/2012 | Bogorad et al. |
| 8,244,211 B2 | 8/2012 | Clark |
| 8,306,879 B2 | 11/2012 | Nonaka |
| 8,346,672 B1 | 1/2013 | Weiner et al. |
| 8,453,940 B2 | 6/2013 | Diamond |
| 8,479,022 B2 | 7/2013 | Dahan et al. |
| 8,494,961 B1 | 7/2013 | Lucas et al. |
| 8,510,820 B2 | 8/2013 | Oberheide et al. |
| 8,578,454 B2 | 11/2013 | Grim |
| 8,736,424 B2 | 5/2014 | Shoarinejad et al. |
| 8,739,259 B1 | 5/2014 | Kumar et al. |
| 8,763,077 B2 | 6/2014 | Oberheide et al. |
| 8,805,434 B2 | 8/2014 | Vasudevan |
| 8,887,257 B2 | 11/2014 | Haggerty et al. |
| 9,098,850 B2 | 8/2015 | Weiner et al. |
| 9,196,111 B1 | 11/2015 | Newman et al. |
| 2001/0014870 A1 | 8/2001 | Saito et al. |
| 2002/0023027 A1 | 2/2002 | Simonds |
| 2002/0028671 A1 | 3/2002 | I'Anson et al. |
| 2002/0042722 A1 | 4/2002 | Tsuji et al. |
| 2002/0091569 A1 | 7/2002 | Kitaura et al. |
| 2002/0198777 A1 | 12/2002 | Yuasa |
| 2003/0047613 A1 | 3/2003 | Funamoto et al. |
| 2003/0149663 A1 | 8/2003 | Vonholm et al. |
| 2003/0163384 A1 | 8/2003 | Hendra |
| 2003/0163567 A1 | 8/2003 | McMorris et al. |
| 2003/0193441 A1 | 10/2003 | Zimmerman et al. |
| 2003/0225618 A1* | 12/2003 | Hessburg ............... G06Q 10/02 705/14.27 |
| 2004/0117254 A1 | 6/2004 | Nemirofsky et al. |
| 2004/0117262 A1 | 6/2004 | Berger et al. |
| 2004/0121781 A1 | 6/2004 | Sammarco |
| 2004/0186768 A1 | 9/2004 | Wakim et al. |
| 2004/0243519 A1 | 12/2004 | Perttila et al. |
| 2005/0071673 A1 | 3/2005 | Saito |
| 2005/0091539 A1 | 4/2005 | Wang et al. |
| 2005/0120213 A1 | 6/2005 | Winget et al. |
| 2005/0165684 A1 | 7/2005 | Jensen et al. |
| 2005/0166060 A1 | 7/2005 | Goldthwait et al. |
| 2005/0242921 A1 | 11/2005 | Zimmerman et al. |
| 2005/0255889 A1 | 11/2005 | Haseba et al. |
| 2006/0044115 A1 | 3/2006 | Doi et al. |
| 2006/0089912 A1 | 4/2006 | Spagna et al. |
| 2006/0165060 A1 | 7/2006 | Dua |
| 2006/0174322 A1 | 8/2006 | Turner et al. |
| 2006/0174332 A1 | 8/2006 | Bauban et al. |
| 2006/0230145 A1 | 10/2006 | Zarakhovsky et al. |
| 2006/0235796 A1 | 10/2006 | Johnson et al. |
| 2006/0237528 A1 | 10/2006 | Bishop et al. |
| 2006/0271643 A1 | 11/2006 | Stallman |
| 2007/0055749 A1 | 3/2007 | Chien |
| 2007/0088950 A1 | 4/2007 | Wheeler et al. |
| 2007/0107044 A1 | 5/2007 | Yuen et al. |
| 2007/0156436 A1 | 7/2007 | Fisher et al. |
| 2007/0192245 A1 | 8/2007 | Fisher et al. |
| 2007/0194123 A1 | 8/2007 | Frantz et al. |
| 2007/0202894 A1 | 8/2007 | Dhebri et al. |
| 2007/0214155 A1 | 9/2007 | Chang et al. |
| 2007/0255653 A1 | 11/2007 | Tumminaro et al. |
| 2008/0084272 A1 | 4/2008 | Modiano |
| 2008/0147546 A1 | 6/2008 | Weichselbaumer et al. |
| 2008/0208759 A1 | 8/2008 | Royyuru |
| 2008/0210754 A1 | 9/2008 | Lovett |
| 2008/0222031 A1 | 9/2008 | Shattner et al. |
| 2008/0227471 A1 | 9/2008 | Dankar et al. |
| 2008/0307515 A1 | 12/2008 | Drokov et al. |
| 2009/0044025 A1 | 2/2009 | She |
| 2009/0062939 A1 | 3/2009 | Park |
| 2009/0119190 A1 | 5/2009 | Realini |
| 2009/0138366 A1 | 5/2009 | Bemmel et al. |
| 2009/0165121 A1 | 6/2009 | Kumar |
| 2009/0233579 A1 | 9/2009 | Castell et al. |
| 2009/0235178 A1 | 9/2009 | Cipriani et al. |
| 2009/0287565 A1 | 11/2009 | Bishop et al. |
| 2009/0288012 A1 | 11/2009 | Hertel et al. |
| 2009/0305725 A1 | 12/2009 | Shin et al. |
| 2010/0031349 A1 | 2/2010 | Bingham |
| 2010/0049615 A1* | 2/2010 | Rose ..................... G06Q 20/02 705/17 |
| 2010/0057843 A1 | 3/2010 | Landsman et al. |
| 2010/0114776 A1 | 5/2010 | Weller et al. |
| 2010/0144314 A1 | 6/2010 | Sherkin et al. |
| 2010/0146263 A1 | 6/2010 | Das et al. |
| 2010/0161410 A1* | 6/2010 | Tulloch ............. G06Q 30/0246 705/14.45 |
| 2010/0199086 A1 | 8/2010 | Kuang et al. |
| 2010/0262830 A1 | 10/2010 | Kusakawa et al. |
| 2010/0268618 A1 | 10/2010 | McQuilken |
| 2010/0318801 A1 | 12/2010 | Roberge et al. |
| 2011/0022484 A1 | 1/2011 | Smith et al. |
| 2011/0070901 A1 | 3/2011 | Alward |
| 2011/0078081 A1 | 3/2011 | Pirzadeh et al. |
| 2011/0131419 A1 | 6/2011 | Dowds et al. |
| 2011/0137804 A1 | 6/2011 | Peterson |
| 2011/0219230 A1 | 9/2011 | Oberheide et al. |
| 2011/0251955 A1* | 10/2011 | Lam ..................... G06F 21/32 705/41 |
| 2012/0005026 A1* | 1/2012 | Khan ..................... G06Q 30/02 705/14.64 |
| 2012/0130714 A1 | 5/2012 | Zeljkovic et al. |
| 2012/0144461 A1 | 6/2012 | Rathbun |
| 2012/0185932 A1 | 7/2012 | Stougaard et al. |
| 2012/0198228 A1 | 8/2012 | Oberheide et al. |
| 2012/0303528 A1 | 11/2012 | Weiner et al. |
| 2012/0331536 A1 | 12/2012 | Chabbewal et al. |
| 2013/0023240 A1 | 1/2013 | Weiner et al. |
| 2013/0046976 A1 | 2/2013 | Rosati et al. |
| 2013/0204690 A1 | 8/2013 | Liebmann |
| 2013/0212387 A1 | 8/2013 | Oberheide et al. |
| 2013/0267200 A1 | 10/2013 | Weiner et al. |
| 2014/0040149 A1 | 2/2014 | Fiske |
| 2014/0114846 A1 | 4/2014 | Weiner |
| 2014/0214688 A1 | 7/2014 | Weiner et al. |
| 2014/0282961 A1 | 9/2014 | Dorfman et al. |
| 2014/0376385 A1 | 12/2014 | Boss et al. |
| 2015/0073992 A1 | 3/2015 | Weiner et al. |

(56) References Cited

U.S. PATENT DOCUMENTS

| | | |
|---|---|---|
| 2015/0142589 A1 | 5/2015 | Jin et al. |
| 2015/0304850 A1 | 10/2015 | Weiner et al. |

FOREIGN PATENT DOCUMENTS

| | | |
|---|---|---|
| CN | 101916487 A | 12/2010 |
| CN | 102057385 A | 5/2011 |
| EP | 1424861 A1 | 6/2004 |
| EP | 1460573 A2 | 9/2004 |
| EP | 2611097 | 7/2013 |
| FR | 2832829 | 5/2003 |
| GB | 2460304 A | 12/2009 |
| JP | H10-145354 A | 5/1998 |
| JP | 2001-084311 | 3/2001 |
| JP | 2005-173982 | 6/2005 |
| JP | 2005-215849 | 8/2005 |
| JP | 2005-276025 | 10/2005 |
| JP | 2005-533316 | 11/2005 |
| JP | 2006-014159 | 1/2006 |
| JP | 2006-171855 A | 6/2006 |
| JP | 2006-197458 A | 7/2006 |
| JP | 2006-221351 | 8/2006 |
| JP | 2006-338638 | 12/2006 |
| JP | 2006-350450 | 12/2006 |
| JP | 2007-188150 | 7/2007 |
| JP | 2007-280363 | 10/2007 |
| JP | 2008-210368 | 9/2008 |
| JP | 2008-287321 A | 11/2008 |
| JP | 2009-058637 | 3/2009 |
| JP | 2009-193155 | 8/2009 |
| JP | 2010-009161 | 1/2010 |
| JP | 2010-231777 | 10/2010 |
| JP | 2010-250374 | 11/2010 |
| JP | 2011-002994 A | 1/2011 |
| JP | 2011-053767 | 3/2011 |
| WO | 9834421 A2 | 8/1998 |
| WO | 0173580 A1 | 10/2001 |
| WO | 0208981 A1 | 1/2002 |
| WO | 0219199 A1 | 3/2002 |
| WO | 0242926 A1 | 5/2002 |
| WO | 02060209 A1 | 8/2002 |
| WO | 02102099 A1 | 12/2002 |
| WO | 03027937 A2 | 4/2003 |
| WO | 03046847 A1 | 6/2003 |
| WO | 2006090392 A2 | 8/2006 |
| WO | 2006102848 A1 | 10/2006 |
| WO | 2007021658 A2 | 2/2007 |
| WO | 2007048976 A2 | 5/2007 |
| WO | 2007106906 A2 | 9/2007 |
| WO | 2007117073 A1 | 10/2007 |
| WO | 2008027620 A1 | 3/2008 |
| WO | 2009032687 A2 | 3/2009 |
| WO | 2009113057 A1 | 9/2009 |
| WO | 2009156880 A1 | 12/2009 |
| WO | 2010087535 A1 | 8/2010 |
| WO | 2010111023 A1 | 9/2010 |
| WO | 2010120222 A1 | 10/2010 |
| WO | 2010140876 A1 | 12/2010 |
| WO | WO 2011/074500 | 6/2011 |
| WO | 2011083471 A1 | 7/2011 |

OTHER PUBLICATIONS

Supplementary European Search Report for European Application No. 11731739.6, dated Aug. 7, 2013, 7 pages.
Office Action for U.S. Appl. No. 13/520,185, dated Jul. 9, 2015.
Final Office Action for U.S. Appl. No. 13/520,185, dated Jan. 6, 2016.
International Search Report and Written Opinion for International Application No. PCT/IL2011/00015, dated May 23, 2011, 7 pages.
First Office Action for Chinese Application No. 201280035348.3, dated Jan. 29, 2016 with partial English-language translation.
International Search Report and Written Opinion for International Application No. PCT/IL2012/050199, dated Sep. 26, 2012.
Office Action for U.S. Appl. No. 14/240,395, dated Aug. 31, 2015, 23 pages.
International Search Report and Written Opinion for International Application No. PCT/IL2012/050328, dated Dec. 21, 2012.
International Search Report and Written Opinion for International Application No. PCT/IL2013/050318, dated Jul. 31, 2013.
International Search Report and Written Opinion for International Application No. PCT/IL2009/000263, dated Jul. 6, 2009.
Office Action for U.S. Appl. No. 13/731,028, dated Nov. 5, 2015.
Office Action for U.S. Appl. No. 13/625,148, dated Apr. 10, 2014.
Office Action for U.S. Appl. No. 13/625,148, dated Jun. 14, 2013.
Office Action for U.S. Appl. No. 13/625,148, dated Jan. 10, 2014.
Office Action for U.S. Appl. No. 14/755,707, dated Oct. 21, 2015.
Office Action for U.S. Appl. No. 14/703,189, dated Aug. 13, 2015.
Final Office Action for U.S. Appl. No. 14/703,189, dated Mar. 7, 2016.
Heine, "GSM Networks: Protocolas, Terminology, and Implementation", 1999, pp. 116 and 328, Artech House, Inc., Norwood, MA.
Newton's Telecom Dictionary, Jul. 2010, 'Mixed Mode'—'MNA', CMP Books, Gilroy, CA.
Miller, "Payment Method Bypasses the Wallet", The New York Times Reprint, May 23, 2011.
Latze et al., "A Proof of Concept Implementation of a Secure E-Commerce Authentication Scheme", Jul. 2009, Information Security South Africa, Johannesberg, South Africa, retrieved from Internet on Jun. 25, 2012 from http://www.latze.ch/latze-ruppen-ultesnitsche.pdf.
McHeck Brochure, Retrieved from Internet on Jun. 25, 2012 from http://main.mchek.com/pdf/mchek-brochure.pdf.
Gao, "P2P-Paid: A Peer-to-Peer Wireless Payment System", Proceedings of the 2005 Second IEEE International Workshop on Mobile Commerce and Services (WMCS'05), 2005, 0-7695-2391-9/05, Institute of Electrical and Electronics Engineers.
International Search Report for PCT application PCT/IL2012/050178, Issued by the EPO, dated Sep. 17, 2012.
Written Opinion of the International Searching Agency for PCT application PCT/IL2012/050178, Issued by the EPO, dated Sep. 17, 2012.
"Mobile Payment", Wikipedia, the free encyclopedia, Accessed on Jan. 20, 2010.
Fun et al., "Privacy in New Mobile Payment Protocol", World Academy of Science, Engineering and Technology, 2008, issue 47, pp. 443-447.
Screen Shot of web site of Mobiqa AIRLINES, Retrieved from the Internet on Dec. 9, 2009 from http://www.mobiqa.com/airlines/?gclid=CLqyxOefyZ4CFWIr4wodbx7wrg.
"IPCS & barcode enabling mobile payment", Retrieved from the Internet on Jun. 25, 2012 from http://www.ipcslive.com/pdf/IPCSbar.pdf.
Carr, "Mobile Payment Systems and Services: An Introduction", 2007, Retrieved from Internet on Jun. 25, 2012 from http://www.mpf.org.in/pdf/Mobile%20Payment%20Systems%20and%20Services.pdf.
Weiss, "Performing Relay Attacks on ISO 14443 Contactless Smart Cards using NFC Mobile Equipment", Master's Thesis in Computer Science, University of Munich, Germany, May 17, 2010.
Mulliner, "Vulnerability Analysis and Attacks on NFC-enabled Mobile Phones", 2009 International Conference on Availability, Reliability and Security, pp. 695-700, 978-0-7695-3564-7/09, Institute of Electrical and Electronic Engineers.
Mulliner, "Attacking NFC Mobile Phones", 25th Chaos Communication Congress, Dec. 2008, Berlin, Germany.
"Is NFC too Slow?", Insight-Driven Retailing Blog, ORACLE, Retrieved from the Internet on May 15, 2011.
Vamosi et al. "Multi-Channel Authentication Via Mobile Banking" Javelin Strategy & Research, Sep. 2009, Pleasanton, CA.
Office Action for U.S. Appl. No. 13/520,185, dated Jul. 29, 2016.
Office Action for Japanese Application No. 2014-510948, dated Jun. 28, 2016.
Office Action for Japanese Application No. 2014-514222, dated May 24, 2016.
Office Action for U.S. Appl. No. 14/124,719, dated Jun. 16, 2016.

(56) References Cited

OTHER PUBLICATIONS

Final Office Action for U.S. Appl. No. 14/240,395, dated Apr. 7, 2016.
Office Action for U.S. Appl. No. 14/240,395, dated Oct. 20, 2016.
Office Action for Japanese Application No. 2014-527810, dated Apr. 26, 2016.
Final Office Action for U.S. Appl. No. 13/731,028, dated Jun. 8, 2016.
Final Office Action for U.S. Appl. No. 14/755,707, dated May 12, 2016.
Office Action for U.S. Appl. No. 14/703,189, dated Sep. 23, 2016.
Office Action for U.S. Appl. No. 13/520,185, dated Feb. 10, 2017.
Office Action for Israeli Application No. 229881, dated Mar. 20, 2017, 2 pages.
Final Office Action for U.S. Appl. No. 14/124,719, dated Jan. 30, 2017.
Final Office Action for U.S. Appl. No. 14/240,395, dated Mar. 30, 2017.
Office Action for Japanese Application No. 2014-527810, dated Mar. 14, 2017.
Notice of Reasons for Rejection for Japanese Application No. 2015-505068, dated Mar. 16, 2017, 10 pages.
Office Action for U.S. Appl. No. 13/731,028, dated Nov. 9, 2016.
Final Office Action for U.S. Appl. No. 13/731,028, dated Apr. 13, 2017.
Final Office Action for U.S. Appl. No. 14/511,751, dated Dec. 19, 2016.
Office Action for U.S. Appl. No. 14/755,707, dated Nov. 17, 2016.
Final Office Action for U.S. Appl. No. 14/755,707, dated Jun. 12, 2017.

* cited by examiner

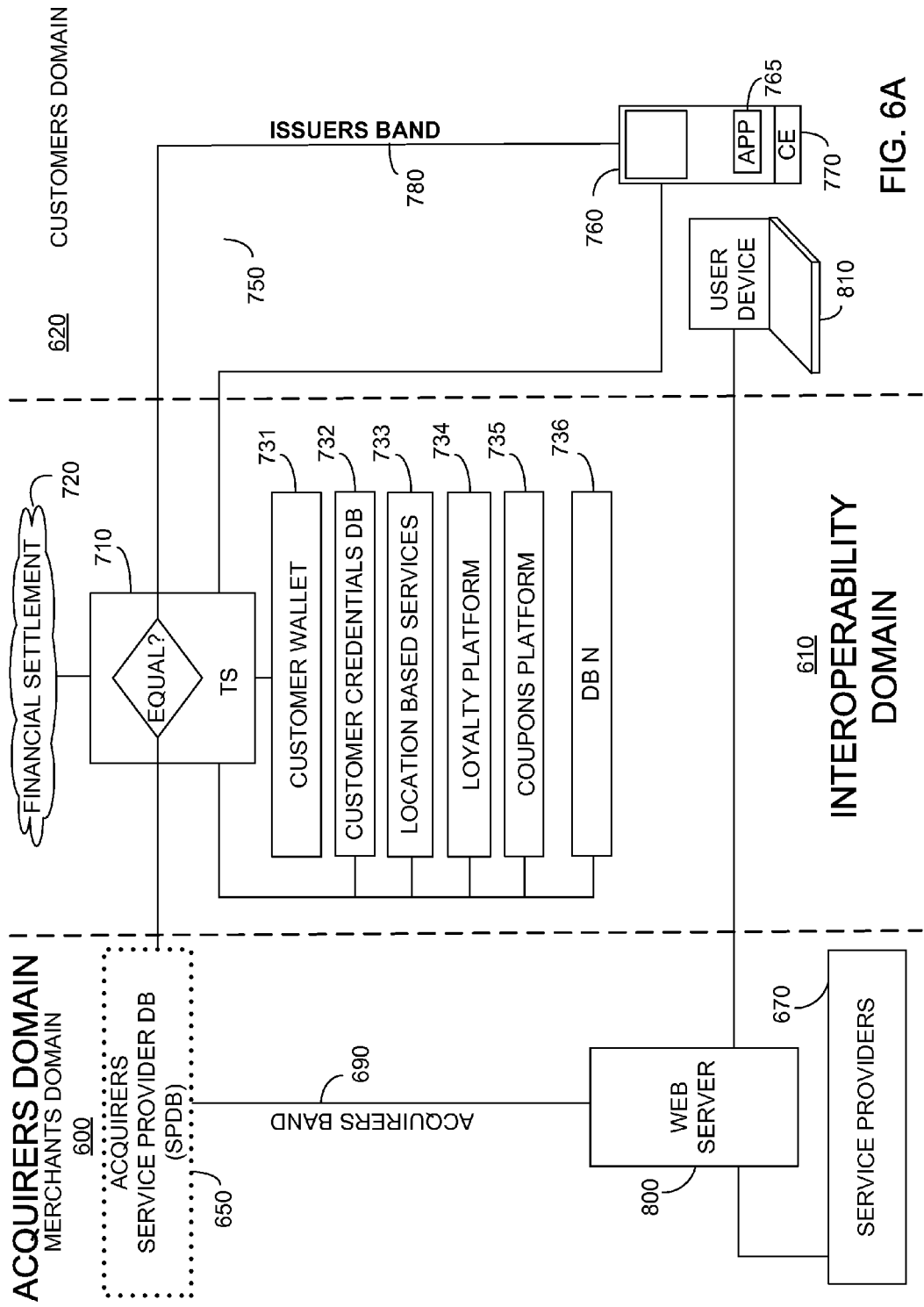

SYSTEM AND METHOD FOR PERFORMING A SECURE TRANSACTION

CROSS-REFERENCE TO RELATED APPLICATIONS

This application claims priority under 35 U.S.C. §371 to, and is a U.S. National Phase Application of, International Patent Application No. PCT/IL2012/050178, filed May 16, 2012, entitled "System and Method for Performing A Secure Transaction," which claims the benefit under 35 U.S.C. §119(e) of U.S. Provisional Application No. 61/486,866, filed May 17, 2011, entitled "System and Method for Performing A Secure Transaction," each of which is incorporated by reference herein in its entirety.

TECHNICAL FIELD

The present disclosure relates generally to the field of transaction systems and in particular to a system and method for performing a secure transaction between a mobile device or a computer and a transaction server.

BACKGROUND ART

Payments by credit or debit cards represent a large portion of consumer spending. Historically, credit or debit cards were encoded with a magnetic stripe, which allows a transaction responsive to a transaction device arranged to read information encoded on the magnetic stripe, in a secured manner. The device reading the magnetic stripe is typically in communication with the credit card issuer via a transaction network, the credit card issuer ultimately approving the transaction. Credit or debit cards are unfortunately susceptible to theft which may be unrealized by the user for a significant period of time.

Advances in technology have led to the development of contactless smart cards, such as those defined under ISO/IEC 7210 and ISO/IEC 14443, also known as Near Field Communication (NFC). Similar technology is available meeting other standards or protocols generally under the term radio frequency identification (RFID), with the range of RFID typically restricted to be of the same order as that of NFC. The term contactless element (CE) as used throughout this document refers to any short range communication device operating under any of NFC, RFID or other short range communication standard with range on the same order as that of NFC, and typically require that the CE be juxtaposed with a reader. The use of optically readable codes are specifically included herein with the definition of a CE. Such CE smart cards may be used for transactions, however since they may be read by any reader within about 4 cm, they do not provide for increased security. As such, CE smart cards are typically only used for low value transactions, wherein a small value is pre-loaded on the CE smart card, and the small value is depreciated with each transaction until a limit is reached.

Mobile devices (MDs) are increasingly being used for financial transactions due to their ubiquity, available screen and input devices. An MD as used herein includes any electronic MD used for personal functionalities such as multimedia playing, data communication over a network or voice communication. One embodiment of an MD is a mobile station, also known as a mobile communication device, mobile phone, mobile telephone, hand phone, wireless phone, cell phone, cellular phone, cellular telephone, mobile handset or cell telephone.

With the development of IEEE 802.11, and the broad establishment of the resultant wireless networks, various MDs have been developed which communicate over available wireless networks in addition to cellular telephone capabilities. Furthermore, various MDs have been developed with the ability to access the Internet both over a wireless network and/or over a cellular network.

The ubiquitous MD, having an associated means for user identification and charging expenses, presents an opportunity to utilize the MD as an electronic wallet. There are several known methods for providing a service or a product, and in particular, payment for products or services other than phone usage or airtime, by using a mobile station.

CEs in cooperation with an MD have been developed into two main groups, devices which are connected to a controller of the MD, such as to the MD's CPU, and can communicate therewith, and devices which are not connected to the MD's CPU. In the case of CEs connected to the MD's CPU one can find various devices, such as NFC devices on SIM cards, also known as "SIM Contactless Element" (SCE), external cards such as SD cards with NFC devices, SIM add-on Contactless Elements (SCCE), and NFC devices found within the MD's hardware. The above group of devices denoted herein as "embedded CE" (ECE) devices can be used in the same manner as CE devices which are not connected to the MD's CPU for applications where the CE reader communicates with the CE device directly and the communication doesn't rely on any action of the MD's CPU. It is to be noted that in the event that the CE comprises an optically readable code displayed on a display of the MD, the MD is inherently an ECE device.

The group of CEs which are not connected to an MD CPU may include NFC or RFID tags, stickers, key fobs, optically readable codes which may be affixed to the MD, and other form factors. Such a CE, when secured in relation to the MD may thus be utilized to provide an identification number read by a reader within proximity of the CE.

As transaction systems have become more sophisticated and in more widespread use, the incidence of fraudulent transactions have also increased. In particular, both "phishing" and "man in the middle" attacks have been shown to defeat many CE based security systems. In a phishing attack, a user is sent a message indicating that connection to a specific uniform resource locator (URL) is required, however the URL, while appearing to be a legitimate URL, is actually that of a fraudulent server. The user may not recognize, or notice, the slight change in URL, whose actual address refers to a fraudulent server. In such a manner personal information and passwords may be obtained from an unsuspecting user.

Man in the middle attacks are particularly useful against ECE devices, wherein the CE may be read by a fraudulent reader, and relayed to a remote purchasing location without the user being aware.

Recently CE enabled posters have become common, with the poster having embedded CE devices therein. A user with an ECE juxtaposes the CE with an embedded CE, which acts to generate a pointer on the MD to a target URL, perhaps offering a discount. Unfortunately, a legitimate embedded CE may be covered by a fraudulent embedded CE, or may be covered by a blocking material with an adjacent fraudulent CE attached, causing the MD to generate a pointer to a fraudulent URL.

What is needed, and is not provided by the prior art, is a method of increased security without requiring significant effort on the part of the user, and preferably appropriate for use with any MD, without requiring specific features, applications, or devices. Such a method is preferably equally appropriate for use with a computer or other device connecting to a transaction server over a network, such as the Internet.

SUMMARY OF INVENTION

In view of the discussion provided above and other considerations, the present disclosure provides methods and apparatus to overcome some or all of the disadvantages of prior and present methods of performing a secure transaction. Other new and useful advantages of the present methods and apparatus will also be described herein and can be appreciated by those skilled in the art.

Certain embodiment enable a secure transaction system constituted of: a two dimensional platform arranged for variable display; at least one antenna arranged to receive a signal from a contactless element, each of the at least one antenna secured at a fixed location on the two dimensional platform; a transaction server; and a poster communication device in communication with each of the at least one antenna and with the transaction server, the poster communication device arranged to read an identifier of a contactless element juxtaposed with a particular one of the at least one antenna, and transmit the read contactless element identifier and identification information associated with the particular antenna to the transaction server.

Certain embodiments enable a secure transaction system comprising: a two dimensional platform arranged for variable display; at least one antenna arranged to receive a signal from a contactless element, each of the at least one antenna secured at a fixed location on the two dimensional platform; a transaction server; and a poster communication device in communication with each of the at least one antenna and with the transaction server, the poster communication device arranged to read an identifier of a contactless element juxtaposed with a particular one of the at least one antenna, and transmit the read contactless element identifier and identification information associated with the particular antenna to the transaction server.

In certain further embodiments, the transaction server comprises a database, wherein the transaction server is arranged to: transmit information to a mobile device responsive to address information stored on the database associated with the read contactless element identifier, the mobile device associated with the contactless element.

In certain further embodiments, the identification information associated with the particular antenna is stored in a memory associated with the particular antenna. In other certain further embodiments, the identification information associated with the particular antenna is stored in a memory associated with the poster communication device.

In certain further embodiments, the poster communication device is further arranged to transmit loyalty benefit information associated with the particular one of the at least one antenna to the transaction server.

In other certain further embodiments, the transaction system further comprises a provider associated device in communication with the transaction server, the provider associated device having an identifier, the provider associated device arranged to: read the identifier of the contactless element responsive to the contactless element being juxtaposed therewith; and transmit the read contactless element identifier and the provider associated device identifier to the transaction server, the transaction server arranged to transmit transaction information associated with the contactless element to the provider associated device responsive to the received read contactless element identifier and the received provider associated device identifier. In certain yet further embodiments the transmitted transaction information comprises loyalty benefits associated with contactless element identifier.

In certain further embodiment, the transaction system further comprises a provider associated device in communication with the transaction server, the provider associated device associated with particular antenna identification information, and wherein: the transaction server comprises a customer wallet functionality; the contactless element is associated with a mobile device, the mobile device in communication with the transaction server; and the identification information associated with the particular antenna is associated with a particular provider, the customer wallet functionality arranged to transmit to the mobile device at least one of payment options and loyalty benefits responsive to the particular antenna identification information. In certain yet further embodiments the transaction server is arranged to obtain location information for the mobile device, and to compare the obtained location information for the mobile device with location information associated with the particular antenna identification information, the transaction server further arranged to prevent a transaction in the event that the obtained location information for the mobile device is not consonant with the location information associated with the particular antenna identification information.

Independently, certain embodiments enable a method of performing a secure transaction comprising: providing at least one antenna arranged to receive a signal from a contactless element, each of the provided at least one antenna secured at a fixed location on a two dimensional platform; reading an identifier of a contactless element juxtaposed with a particular one of the provided at least one antenna; and transmitting the read contactless element identifier and identification information associated with the particular antenna to a transaction server, and enabling a transaction characteristic responsive to the read identifier.

In certain further embodiments, the method further comprises: transmitting information to a mobile device responsive to stored address information associated with the read contactless element identifier, the mobile device associated with the contactless element. In other further embodiments the method further comprises: transmitting information to a mobile device responsive to stored address information associated with the read contactless element identifier, the mobile device associated with the contactless element, the transmitted information comprising loyalty benefit information associated with the particular one of the provided at least one antenna.

In certain further embodiment, the method further comprises: transmitting loyalty benefit information associated with the particular one of the at least one antenna to the transaction server. In other certain further embodiments, the method further comprises: providing a provider associated device in communication with the transaction server; reading the contactless element identifier responsive to the contactless element being juxtaposed with the provided provider associated device; transmitting the read contactless element identifier and a provider associated device identifier to the transaction server; and transmitting transaction information associated with the contactless element to the provider associated device responsive to the received read contactless element identifier and the received provider associated device identifier. In certain yet further embodiments, the transmitted transaction information comprises loyalty benefits associated with the contactless element identifier.

In certain further embodiments, the method further comprises transmitting to the mobile device at least one of payment options and loyalty benefits responsive to the particular antenna identification information. In certain yet further embodiments, the method further comprises: obtaining location information for the mobile device; comparing the obtained location information for the mobile device with location information associated with the particular antenna identification information; and preventing a transaction in the event that the obtained location information for the mobile device is not consonant with the location information associated with the particular antenna identification information.

Independently, certain embodiments enable a secure transaction system comprising: a transaction server, the transaction server comprising a customer wallet functionality; a provider associated device in communication with the transaction server, the provider associated device comprising an identifier; and a mobile device in communication with the transaction server, the customer wallet functionality arranged to transmit to the mobile device at least one of payment options and loyalty benefits responsive to the provider associated device identifier.

In certain further embodiments, the transaction server is arranged to obtain location information for the mobile device, and to compare the obtained location information for the mobile device with location information associated with the provider associated device, the transaction server further arranged to prevent a transaction in the event that the obtained location information for the mobile device is not consonant with the location information associated with the provider associated device. In certain further embodiments, the transaction server is further in communication with a customer payment resource, the transaction server arranged to settle a transaction in cooperation with the customer payment resource. In certain further embodiments the provider associated device is a web server.

Additional features and advantages of the invention will become apparent from the following drawings and description.

BRIEF DESCRIPTION OF DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 6A illustrates a high level block diagram of an embodiment of the arrangement of FIG. 5A, wherein the access point is replaced by a web server.

DESCRIPTION OF EMBODIMENTS

Figure 1A:
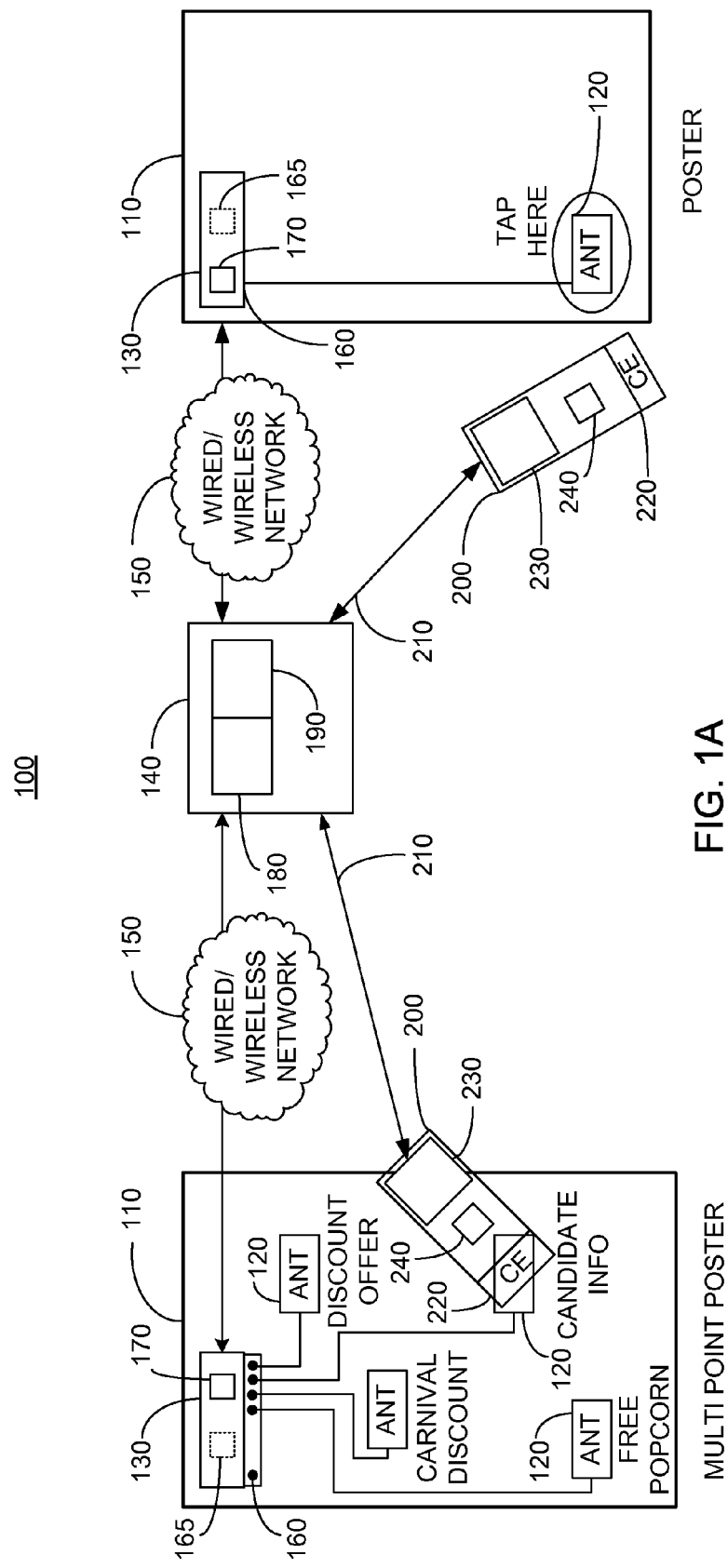
FIG. 1A illustrates a high level block diagram of an exemplary embodiment of a secure transaction system arranged for use with posters having embedded thereon one or more antennas.

Before explaining at least one embodiment in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. In particular, the term connected as used herein is not meant to be limited to a direct connection and includes communication of any sort, and allows for intermediary devices or components without limitation.

In the following description, the term mobile device (MD) includes any electronic mobile device used for personal functionalities such as multimedia playing, data communication over a network or voice communication, including but not limited to a mobile station (MS). For clarity, the term MS refers to any mobile communication device, mobile phone, mobile telephone, hand phone, wireless phone, cell phone, cellular phone, cellular telephone, cell telephone, or other electronic device used for mobile voice or data communication over a network of base stations. Although in the following description, communication is described in certain embodiments using an example of cellular communication, particularly, global system for mobile communication (GSM), it will be understood that the scope of the invention is not limited in this respect, and that the communication method used may be based on any suitable communication protocol, including without limitation, Universal Mobile Telecommunications System (UMTS), IEEE 802.11x, IEEE 802.16x and CDMA. The terms "decrypted" and "decoded" are used interchangeably and have the same meaning throughout this document.

Figure 1B:
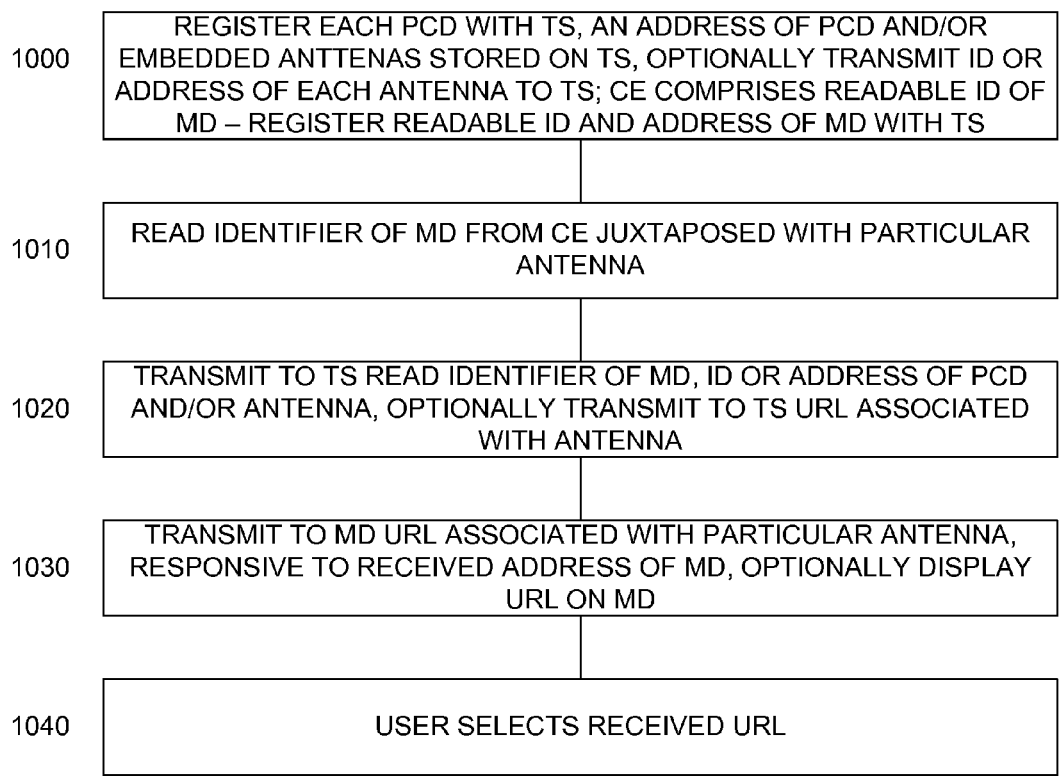
FIG. 1B illustrates a high level flow chart of a method of operation of the system of FIG. 1A.

FIG. 1A illustrates a high level block diagram of an exemplary embodiment of a secure transaction system 100 arranged for use with posters 110 having embedded thereon one or more antennas 120 and FIG. 1B illustrates a high level flow chart of a method of operation of the system of FIG. 1A, the figures being described together. In one embodiment, each antenna 120 is associated with an advertisement, the antenna 120 being embedded in proximity to the advertisement. A poster communication device (PCD) 130 is provided with each poster 110 and is in communication with a transaction server (TS) 140 over a communication network 150, which may be wired, wireless, or a combination thereof, without limitation. Each PCD 130 comprises: one or more antenna connections 160; an optional database 165; and a communication module 170. Each antenna 120 is connected to an associated PCD 130. In one embodiment, each antenna 120 is connected to a respective antenna connection 160 of the associated PCD 130. In another embodiment, a single antenna connection 160 is provided in the associated PCD 130, each associated antenna 120 connected to the single antenna connection 160 and each antenna 120 exhibiting a particular identifier or address, thus enabling addressed based bus communication. In one embodiment, an identifier or address associated with each antenna 120 is stored on optional database 165 of the associated PCD 130. TS 140 comprises: a communication module 180; and a database 190 which contains the identifiers or addresses of each of the antennas 120 and its respective content such as but not limited to a URL address. TS 140 is further in communication with a plurality of MDs 200 over a communication network 210, which may be the same as communication network 150, or a different network, without limitation. Each MD 200 comprises: a CE 220; a display 230; and an entry device 240. CE 220 contains thereon an identifier, identifying the respective MD 200 to TS 140, the identifier arranged to be readable by each antenna 120 when juxtaposed in proximity thereof. In one embodiment, entry device 240 is a keypad or keyboard. In another embodiment, display 230 and entry device 240 constitute a single touch screen. The CE 220 readable identifier may be the MSISDN or other address of MD 200, without limitation.

In stage 1000, each PCD 130 is registered with TS 140 and each MD 200 is registered with TS 140. In particular, each MD 200 provides a communication address, such a telephone number, and further provides the readable identifier of its CE 220 to TS 140. Preferably, the readable ID does not directly provide addressing information for CE 220, and such addressing information cross-reference is only available via TS 140 responsive to stage 1000. Additionally, each PCD 130 is registered with TS 140. In one embodiment, the address of each PCD 130 is stored on database 190 and is stored associated with provider information, such as a target URL or supplier data and discount data. Preferably, for each PCD 130, a plurality of identifiers or addresses for each of the respective antennas 120 are further stored. In one embodiment, each antenna 120 of each PCD 130 is identified in relation to provider information, such as a related target URL or loyalty program database. Such provider information is preferably consonant with displayed information on poster 110, the displayed information acting as advertising content for the relevant provider.

In stage 1010, CE 220 of an MD 200 is juxtaposed with a particular antenna 120 and the particular antenna 120 reads the identifier of MD 200 from CE 220. CE 220 of the MD 200 is juxtaposed to the particular antenna responsive to the user's interest based on the displayed information as described above. The associated PCD 130 receives the read identifier of the juxtaposed MD 200 from the particular antenna 120. In stage 1020, PCD 130 transmits the read identifier of the juxtaposed MD 200 to transaction server 120 and further transmits an identifier or address of PCD 130 and/or an address or identifier of the particular antenna 120 to TS 140 via communication network 150. In the event that a URL associated with the particular antenna is stored on optional database 165 of the associated PCD 130, the URL is further transmitted to TS 140.

In stage 1030, TS 140 compares the received readable identifier of the juxtaposed MD 200 with readable identifiers stored on database 190 responsive to stage 1000. In the event that the received readable identifier matches a readable identifier stored on database 190, communication module 180 communicates with MD 200, responsive to the stored address of MD 200. TS 140 transmits the URL or any other content associated with the particular antenna 120 to MD 200 and the URL is displayed on display 230 of MD 200. In stage 1040, the user connects to the desired website by selecting the displayed URL with entry device 240.

Thus, the URL to be sent to MD 200 is determined by the antenna location on poster 110, and controlled by TS 140. Each antenna 120 reads only the publicly available identifier of CE 220 and does not directly transmit information to MD 200, thus preventing fraud.

Figure 2A:
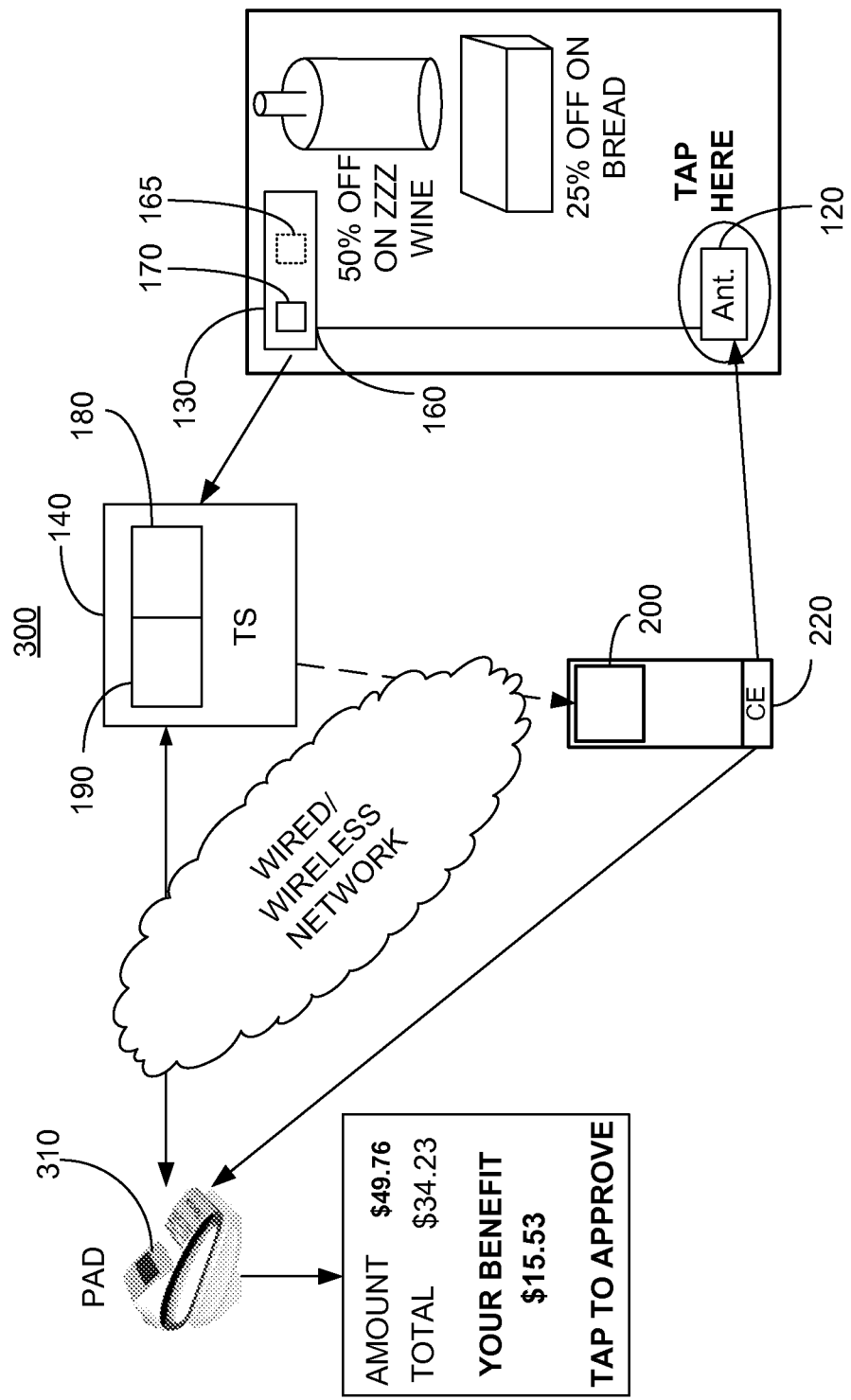
FIG. 2A illustrates a high level block diagram of the transaction system of FIG. 1A in further communication with a PAD.
Figure 2B:
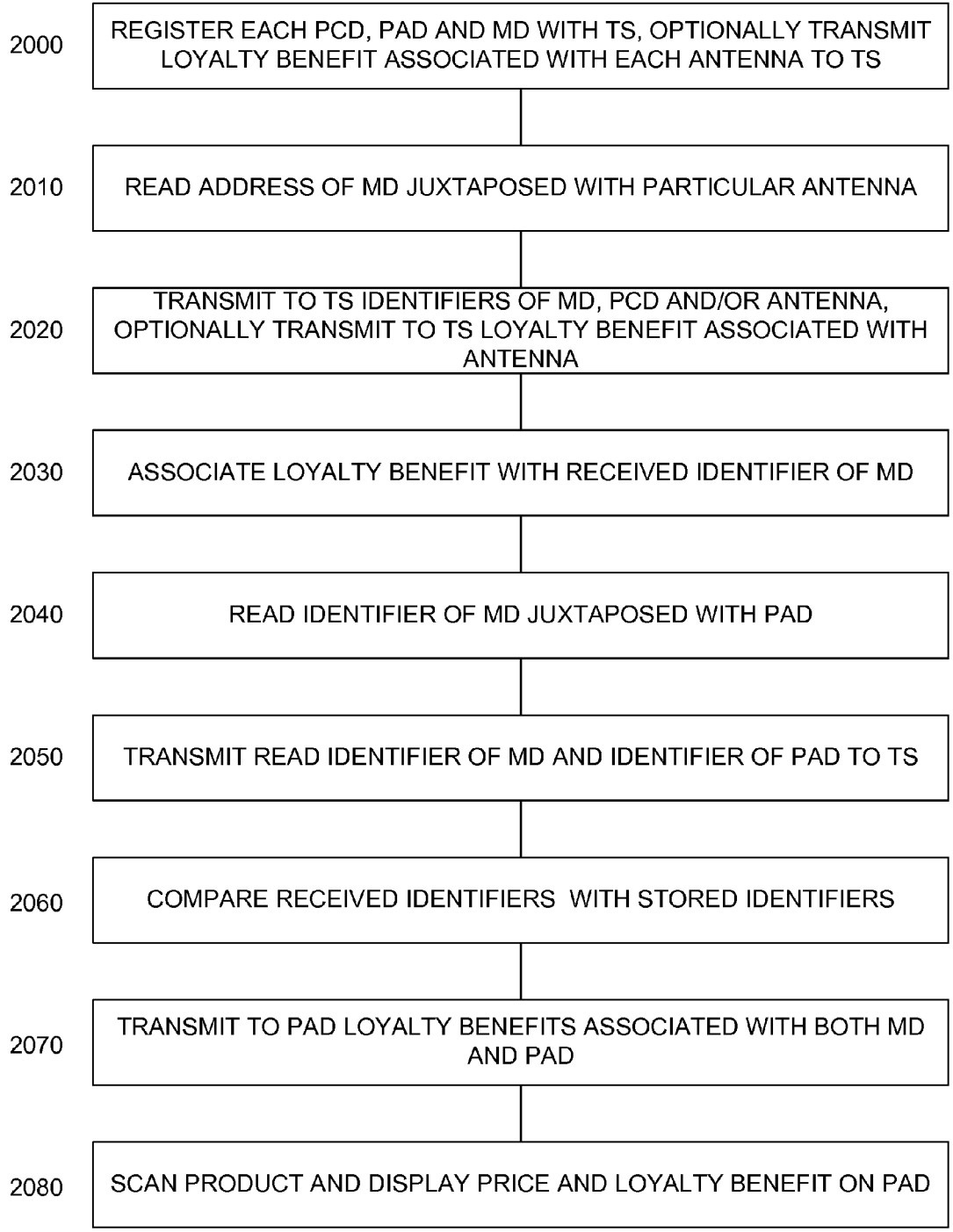
FIG. 2B illustrates a high level flow chart of a method of operation of the system of FIG. 2A.

FIG. 2A illustrates a high level block diagram of an exemplary embodiment of a transaction system 300 and FIG. 2B illustrates a high level flow chart of a method of operation of transaction system 300, the figures being described together. Transaction system 300 is in all respects similar to transaction system 100 of FIG. 1A, with the exception that TS 140 is further in communication with a provider associated device (PAD) 310, which in one non-limiting embodiment is implemented as a sales terminal. Additionally, communication networks 150 and 210 are illustrated as a single network for simplicity, however this is not meant to be limiting in any way. PAD 310 comprises one of: a merchant tag containing a CE; and an NFC MD arranged to read a CE of a user MD. Additionally, each antenna 120 has a loyalty benefit associated therewith which, in one embodiment, is stored on database 190 of TS 140.

In stage 2000, each PCD 130 is registered with TS 140, and each MD 200 is registered with TS 140 as described above in relation to stage 1000. Preferably, in place of a URL, a particular discount or loyalty benefit is stored associated with each antenna 120 identifier or address. Additionally, PAD 310 is registered with TS 140. As indicated above, registration of MD 200 with TS 140 comprises an address of MD 200, such a telephone number or other accessible network address, as well as the readable ID of CE 220.

In stage 2010, CE 220 of an MD 200 is juxtaposed with a particular antenna 120 and the particular antenna 120 reads the identifier of MD 200 from CE 220. Preferably, discount or other offers are further displayed on poster 110 in a location associated with each of the particular antennas 120, thus serving an advertisement function as described above. The associated PCD 130 then receives the read identifier of MD 200 from the particular antenna 120. In stage 2020, PCD 130 transmits the read identifier of MD 200 to TS 140 with antenna identification or address information of the particular antenna 120. Optionally, PCD 130 transmits an address of PCD 130 and/or the particular antenna 120 to TS 140. In the event that the loyalty benefit information associated with the particular antenna is stored on optional database 165 of the associated PCD 130, the loyalty benefit information is further transmitted to TS 140. In stage 2030, TS 140 compares the received read identifier of MD 200 with identifiers stored on database 190. TS 140, which in one embodiment stores on database 190 the loyalty benefit information associated with the particular antenna 120, and in another embodiment receives the loyalty benefit information in the transmission from PCD 130, associates the loyalty benefit with the identifier of MD 200. In one embodiment, communication module 180 communicates with MD 200, responsive to the read identifier of MD 200 received from PCD 130, and the address information of stage 2000, and notifies MD 200 of the received loyalty benefit. The received loyalty benefit may have selection options. In one embodiment, the address of one of PCD 130 or particular antenna 120 is further associated with one or more PADs 310. In such embodiment, communication module 180 further communicates the loyalty or other benefit to the one or more associated PADs 310 along with the readable identifier of MD 200.

In stage 2040, a user juxtaposes CE 220 of MD 200 with the NFC port of PAD 310. PAD 310 reads the readable identifier of CE 220 via the NFC port. In stage 2050, PAD 310 communicates with communication module 180 of TS 140 and transmits the read identifier of CE 220 and the address of PAD 310 to TS 140. In one embodiment, PAD 310 further calculates the amount to be paid based on transaction information and any loyalty or other benefits associated with both user MD 200 and PAD 310 received from TS 140 prior to the juxtaposition of stage 2040, as described above in relation to stage 2030. PAD 310 further communicates with communication module 180 of TS 140 and transmits an authentication request to TS 140. In stage 2060, TS 140 compares the received read identifier of CE 220 with stored identifiers on database 190 of stage 2000. In stage 2070, TS 140 transmits to PAD 310 any loyalty benefit associated with both user MD 200 and PAD 310 not previously communicated.

In stage 2080, a product is scanned by PAD 310 and the price of the product and any loyalty benefit associated with the product is displayed on PAD 310. The transaction is preferably completed as described in International Patent Application Publication S/N WO 2011/083471 A1 entitled "System and Method for Performing a Transaction Responsive to a Mobile Device", the entire contents of which is incorporated herein by reference.

Figure 3A:
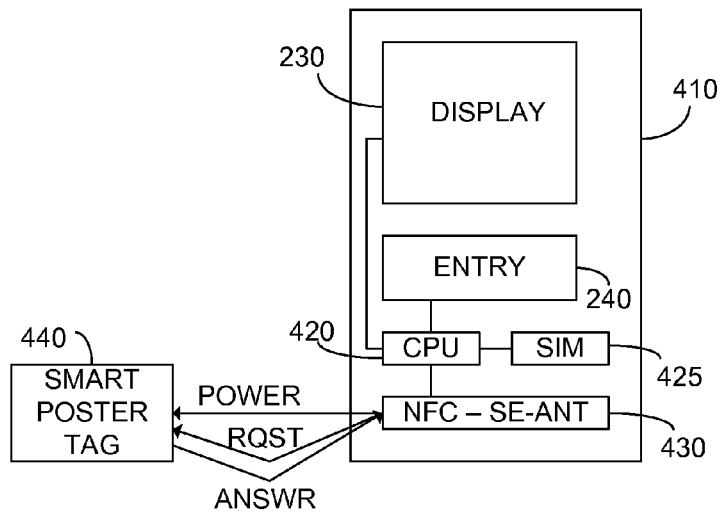
FIG. 3A illustrates a high level block diagram of a CE based transaction system known to the prior art further illustrating certain vulnerabilities therein.

FIG. 3A illustrates a high level block diagram of a CE based transaction system known to the prior art further illustrating certain vulnerabilities therein. In some detail, an MD 410 is illustrated comprising a display 230; an entry device 240, which may be incorporated as part of display 230, without limitation; a computing device 420; an SIM or USIM card 425; and a CE 430, comprising an NFC controller, a secured element and an antenna. Computing device 420 is in communication with each of display 230, entry device 240, SIM or USIM card 425 and CE 430. Smart poster tag 440 is further provided. Other communication devices are typically provided, as is known in the field of mobile devices.

In operation, when CE 430 is juxtaposed with smart poster tag 440, power is provided to smart poster tag 440 from CE 430, CE 430 further sends a request for information to smart poster tag 440, and CE 430 receives an answer from smart poster tag 440. Preferably, all of the power and communication is provided in accordance with one or more know near field communication standards. The data received from smart poster tag 440 is utilized by MD 410 to direct the user to a web site responsive to the received data from smart poster tag 440, initiate a telephone call, send a message to an address responsive to the received data or launch an application.

Such a process is problematic for a number of reasons. In particular, smart poster tag 440 may be blocked or replaced by a fraudulent tag thus directing MD 410 to a phishing or other fraudulent web site. Alternately, by utilizing multiple fraudulent smart poster tags 440, denial of service may be created. Furthermore, malware of worms may be loaded into MD 410 responsive to such a fraudulent smart poster tag 440, since the answer received from smart poster tag 440 is passed to CPU 420 via the NFC controller of CE 430. A secured element is illustrated as a portion of CE 430, such a secured element represents a secure storage location which is not modifiable without following strict security protocols.

Figure 3B:
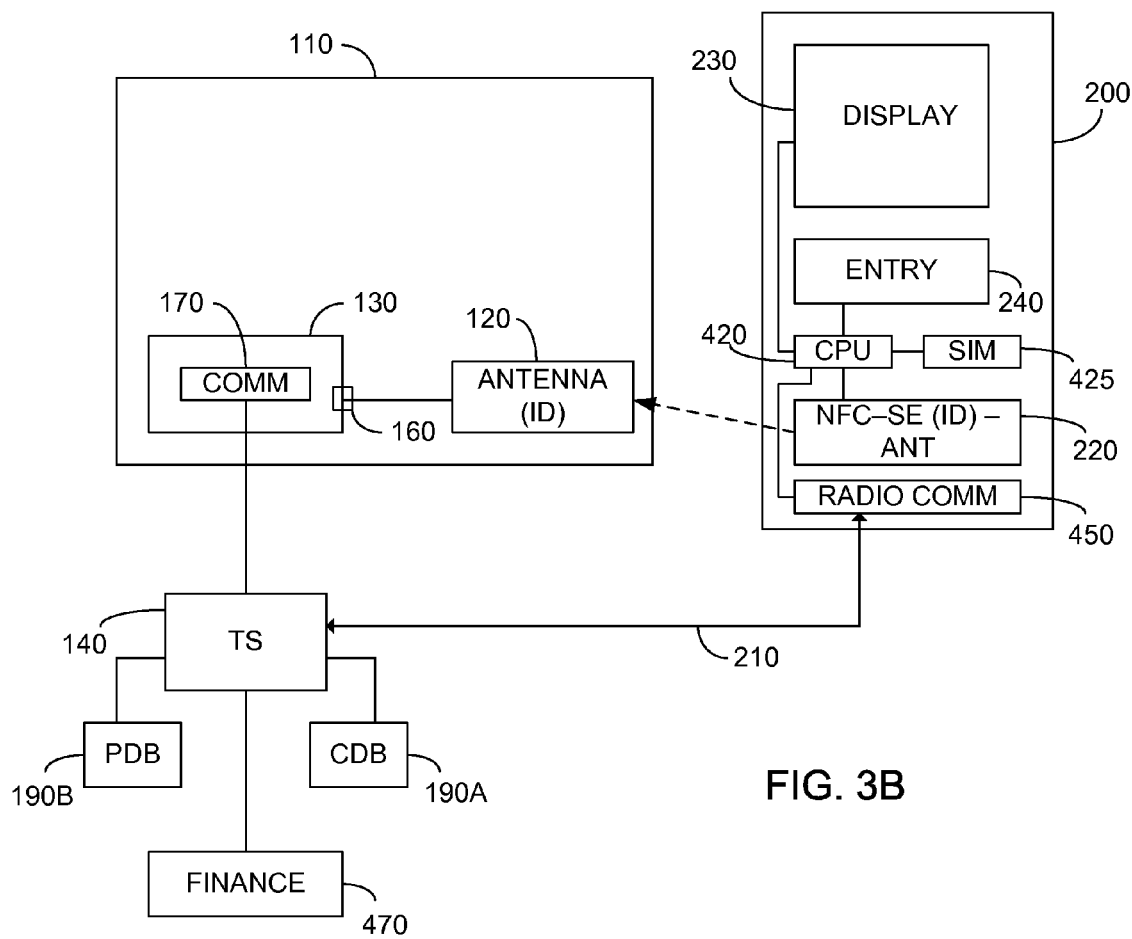
FIG. 3B illustrates a high level block diagram of an exemplary embodiment of a CE based secure transaction system utilizing a transaction server to prevent fraud.

FIG. 3B illustrates a high level block diagram of an exemplary embodiment of a CE based secure transaction system utilizing a transaction server to prevent fraud. The secure transaction system of FIG. 3B comprises an MD 200 and a poster 110. Poster 110 may be replaced with a PAD 310 as described above in relation to FIG. 2A without exceeding the scope. MD 200 comprises: a display 230; an entry device 240, which may be incorporated as part of display 230, without limitation; a computing device 420; an SIM or USIM card 425; and a CE 220, comprising an NFC controller, a secured element and an antenna, with an ID associated with MD 200 stored thereon, preferably within the SE portion of CE 220; and a radio communication 450 device utilized for network communication by MD 200. Computing device 420 is in communication with each of display 230, entry device 240, SIM or USIM card 425, CE 220 and radio communication device 450. Poster 110 is provided comprising: at least one antenna 120, with an associated identifier, and a PCD 130 comprising a communication module 170 and an antenna connection 160. Antenna 120 is coupled to PCD 130 via antenna connection 160 as described above. Antenna 120 is illustrated as having secured thereon, in a memory or hardwired location an ID, however this is not meant to be limiting in any way, and as described above the identifier may be stored with PCD 130 without exceeding the scope. TS 140 is further provided in communication with PCD 130. TS 140 comprises a customer database 190A and a provider database 190B, which illustrates further detail of database 190 described above. TS 140 is further in communication with a financial settlement institution 470, and in radio communication with MD 200 via network 210, particularly with radio communication device 450.

In operation, advantageously only an identifier of CE 220 of MD 200 is read by antenna 120, as indicated by the dashed arrow. It is to be understood that there is no requirement for smart poster tag 110, and the operation thereof may be combined within a PAD, as described above in relation to PAD 310, without exceeding the scope. The read identifier of CE 220 is transmitted to TS 140 which, as indicated above, comprises a customer database 190A and a customer database 190B. TS 140, responsive to the read identifier of CE 220 retrieves address information from customer database 190A, and transmits any required communication to MD 200 over wireless network 210 in a controlled manner, thus decreasing vulnerability to the above mentioned attacks. Provider database 190B comprises a list of registered PADs and antennas thus further blocking fraudulent transactions.

The operation of the prior art system of FIG. 3A is vulnerable to a number of security attacks, which are prevented by the system of FIG. 3B. In particular, in the event of an overlay of a genuine smart poster tag 440 by a fraudulent tag, the system of FIG. 3A will result in MD 410 being directed to an inappropriate server, responsive to the data stored on the fraudulent tag, such a server may by a phishing server. Preferably, as described above, the readable ID does not directly provide addressing information for CE 220, and such addressing information cross-reference is only available via TS 140.

In contrast, as described above, in the system of FIG. 3B an ID of MD 200 is transferred to TS 140 via PCD 130, accompanied by an ID associated with antenna 120, and thus any fraudulent tag will not be successful, since the fraudulent tag, even if successful in reading the readable ID of CE 220, the fraudulent tag is not capable of transmitting the read ID to TS 140, and even if such a fraudulent tag is in communication with its own TS 140, the only information obtained by the fraudulent tag is the read ID of MD 200, which preferably does not directly provide addressing information.

Figure 4:
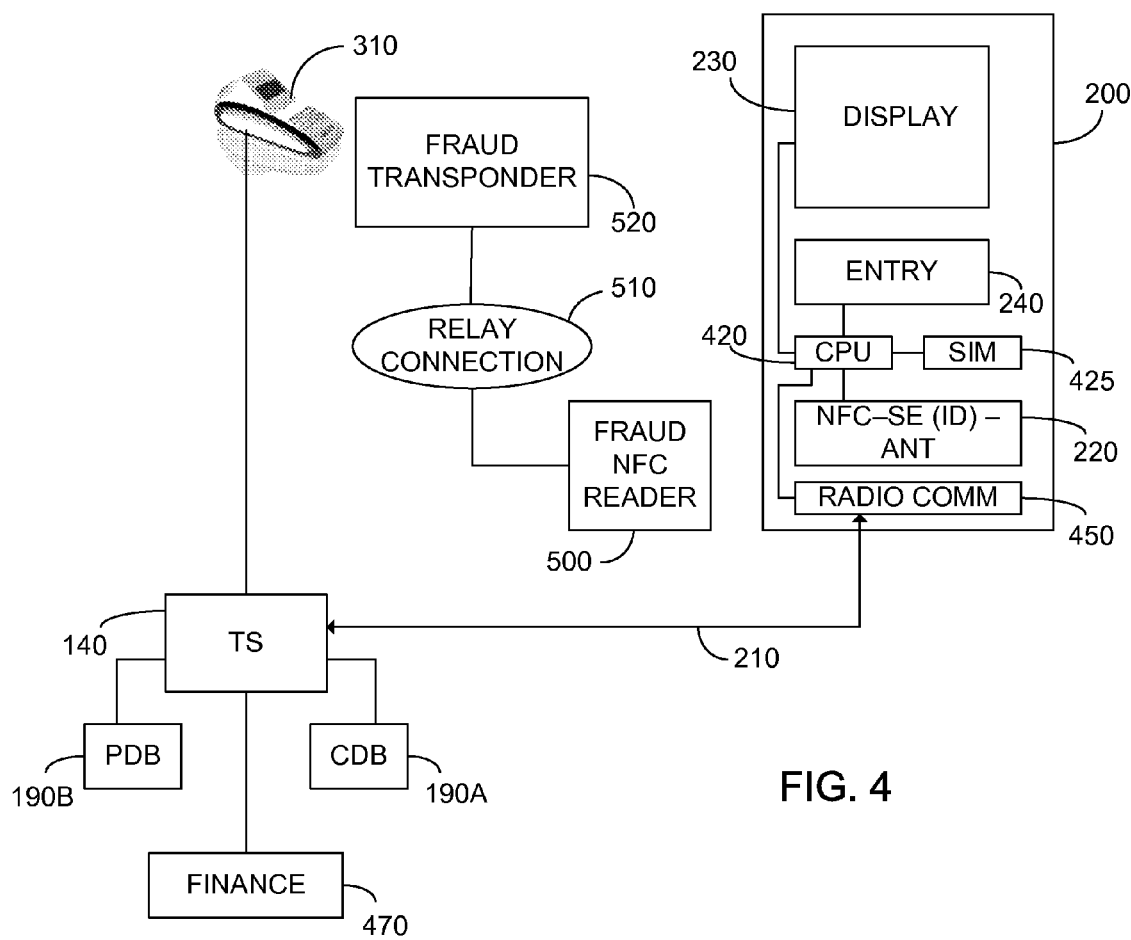
FIG. 4 illustrates protection provided by certain exemplary embodiments in the event of a relay attack.

FIG. 4 illustrates protection provided by certain exemplary embodiments in the event of a relay attack, wherein the system of FIG. 2A is under attach by a relay attacker comprising: a fraudulent NFC reader 500 juxtaposed with MD 200; a relay connection 510 and a fraudulent transponder 520 juxtaposed with PAD 310. Fraudulent NFC reader 500 is arranged to read any CE 220 information in proximity thereof; transponder 520 arranged to present to PAD 310 information read by fraudulent NFC reader 500; and relay connection 510 id arranged to provide communication between reader fraudulent NFC reader 500 and transponder 520. TS 140 is shown in detail as described above in relation to FIG. 3B.

Prior art CE transaction devices are easily defrauded by such a relay attacker, since financial institution 470 has no knowledge of the fraudulence. This is particularly true, since all handshakes and security measures are passed seamlessly by relay connection 510.

The present embodiments block such transactions, since all CE based transactions are presented to TS 140 and transmitted for approval to the actual MD 200 via wireless network 210. As such, the user of MD 200 is aware of the identifier and amount of the actual transaction being precipitated by such a relay attacker and does not provide ultimate authorization.

Figure 5A:
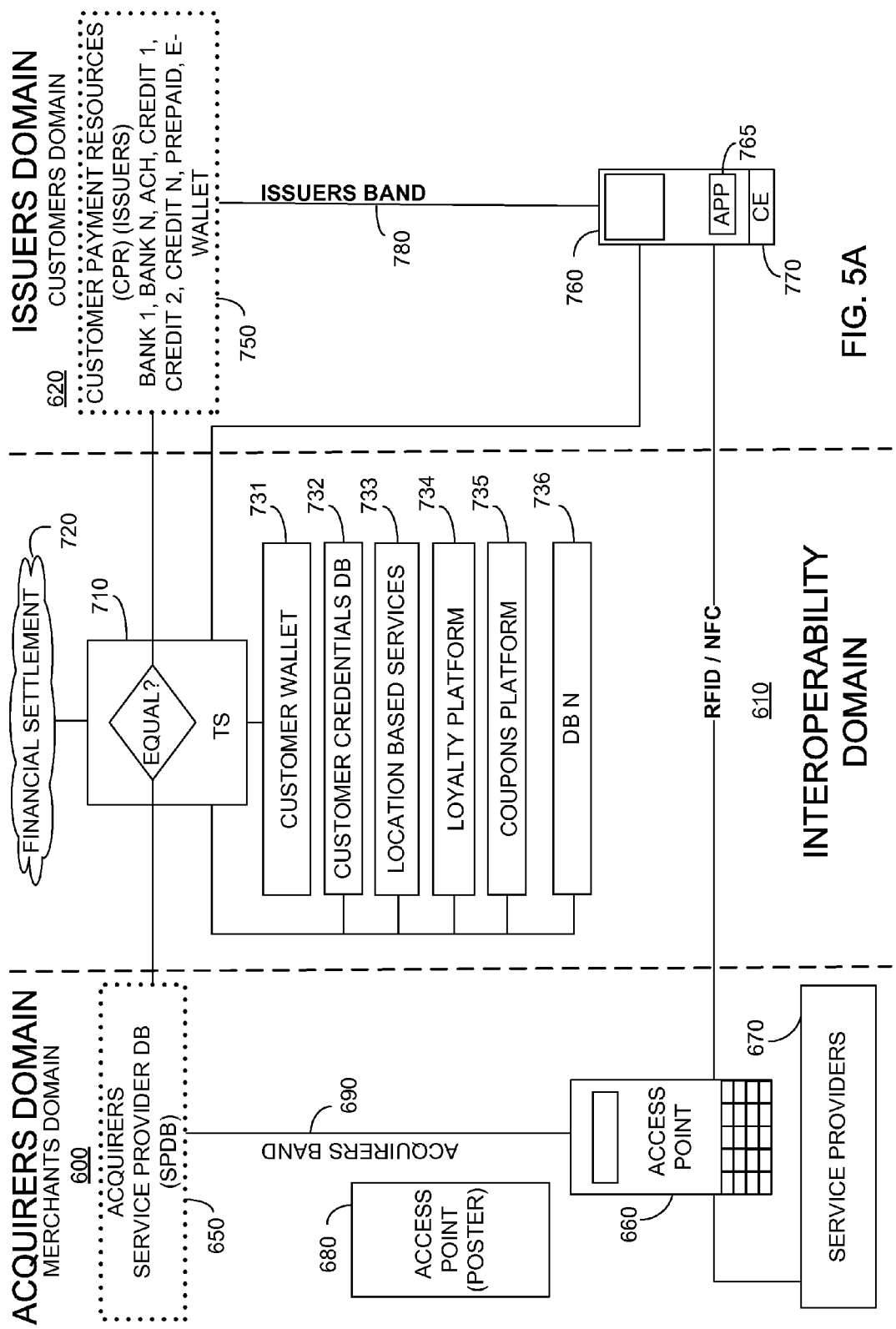
FIG. 5A illustrates a high level block diagram of the advantageous partitioning of certain embodiments of a transaction system arranged to provide improved security for transactions in cooperation with a mobile device.

FIG. 5A illustrates a high level block diagram of the advantageous partitioning of certain embodiments of a transaction system arranged to provide improved security for transactions in cooperation with a mobile device. In particular, an Acquirers Domain 600, also known as Merchants Domain 600; an Interoperability Domain 610; and an Issuer's Domain 620, also known as customer's domain 620 are provided. Advantageously, security information is compartmentalized to prevent fraud.

Acquirer's domain 600 comprises an acquirer 650, comprising a service provider database (SPDB), containing information about the service providers associated therewith; an access point 660; a service provider 670; and an access point poster or tag 680. While a single acquirer, or a database of a single acquirer 650, access point 660, service provider 670 and access point poster/tag 680 this is not meant to be limiting in any way and a plurality of any or all of acquirers 650, or acquirer databases, access points 660, service providers 670 and access point posters/tags 680 may be provided without exceeding the scope. The SPDB of acquirer 650 is in communication with access point 660 with a controlled communication path denoted acquirer's band 690.

Interoperability Domain 610 comprises a TS 710, a financial settlement functionality 720; and a plurality of databases/functionality servers, wherein particularly illustrated are a customer wallet 731, customer credential 732, location based services 733, loyalty platform 734, coupons platform 735 and other databases 736. Financial settlement functionality 720, represented by a cloud, may comprise any, or all of, a brand's functionality, a hub functionality and an automated clearinghouse functionality, without exceeding the scope. TS 710 is in communication with each of financial settlement functionality 720, and each of customer wallet 731, customer credential 732, location based services 733, loyalty platform 734, coupons platform 735 and other databases 736. TS 710 is further in communication with the SPDB of acquirer 650.

Issuer's Domain 620 comprises customer's payment resources 750, i.e. issuers of payment options and devices, and a customer MD 760 comprising a CE 770 and running an application 765 on a processor thereof, application 765 stored on a memory associated with MD 760. MD 760 and CE 770 are in all respects similar to MD 200 and CE 220, except as illustrated herein. Customer's payment resources 750 represents various card issuers, both debit and credit, as well as prepaid cards and e-wallets, without limitation. Customer's payment resources 750 are in communication with customer MD 760 via an issuer's controlled communication band 780. MD 760, particularly CE 770, is in NFC or RFID communication with access point 660, which in one embodiment represents a PAD as described above. Customer's payment resources are further in communication with TS 710. MD 760 is further in communication with TS 710, over a network, such as a cellular network, without limitation.

Figure 5B:
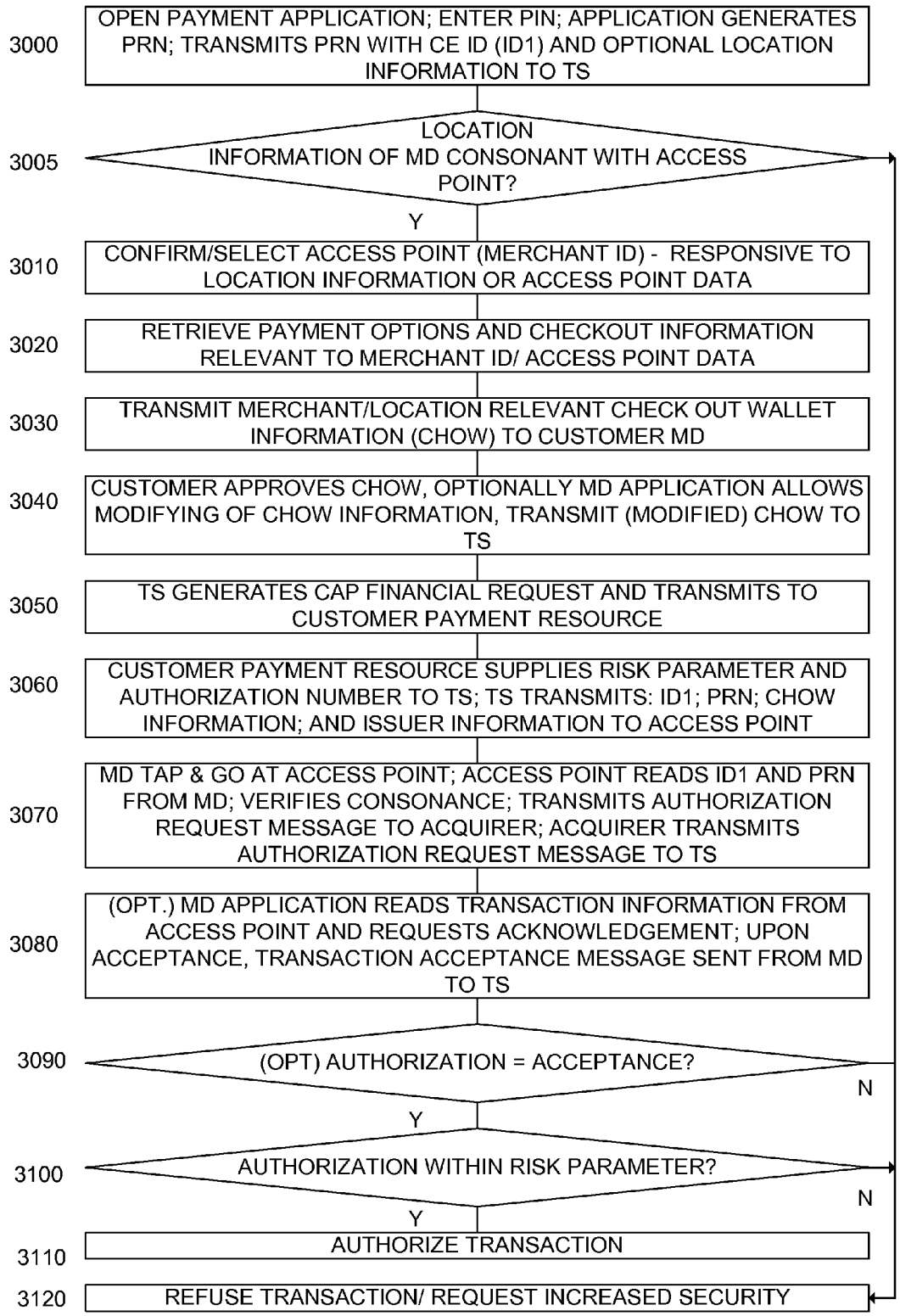
FIG. 5B illustrates a transaction flow utilizing the various domains of FIG. 5A.

FIG. 5B illustrates a transaction flow utilizing the various domains of FIG. 5A, FIGS. 5A and 5B being described herein together for ease of understanding. Advantageously, TS 710 is arranged to provide customer MD 760 with relevant checkout information, while maintaining security and fraud control.

In stage 3000, a customer opens payment application 765 on customer MD 760 and enters a PIN which has been preregistered with TS 710. MD 760 generates a pseudo-random number (PRN) responsive to a PRN key which was initially loaded at registration, and transmits to TS 710 a readable ID of CE 770, the generated PRN and location information. Location information may be generated by one or both of on board GPS electronics, or responsive to base station transmission calculations. The readable ID of CE 770 may be directly transferred, or an identifier may be utilized without exceeding the scope. The readable ID of CE 770 is denoted ID1 for ease of identification, and is preferably either identical with, or uniquely related to an ID readable from CE 770 as described above in relation to CE 220.

In stage 3010, TS 710 authenticates the received PRN and identifies the access points in geographic proximity to MD 760. In particular, in the event that only a single supplier registered with TS 710 exhibits a location consonant with the received location information, TS 710 transmits the name of the identified location to MD 760 for confirmation. In the event that a plurality of suppliers are consonant with the received location information, for example in a mall, a list of registered suppliers with consonant location information is transmitted to customer MD 760, and the appropriate supplier, i.e. the appropriate access point 660, wherein MD 760 is currently located is selected by a user and the selection is transmitted to TS 710.

Alternatively, in the event that access point poster/tag 680 is provided, customer MD 760 may be juxtaposed with access point poster/tag 680. In such an embodiment, as described above, access point poster 680 functions to input the readable identifier of CE 770 and transmits the read identifier of CE 770 to TS 710, thus providing TS 710 with location based information regarding customer MD 760. In particular, a merchant ID is obtained responsive to customer MD 760.

In the event that the location information provided by customer MD 760 is not consonant with the location information for access point 660, in stage 3050 a fraudulent transaction if flagged, and in stage 3120 the transaction is refused. The term consonant is used geographically, to include all potential matches within the accuracy of the location identification equipment, and is thus not meant to be an exact match of pinpoint accuracy.

Alternatively, a prior art poster/tag, which transmits a merchant ID may be utilized, and customer MD 760 reads the merchant ID. Advantageously, in place of a pointer of the prior art, customer MD 760 is arranged to transmit the read ID to TS 710 to provide merchant ID and location information for customer MD 760 to TS 710.

In stage 3020 a merchant ID associated with the current location of customer MD 760 is transmitted to the various databases 1331-1336, denoted herein as cloud, to determine if any promotions, loyalty benefits, pre-purchase coupons, or gift certificates, without limitation, are relevant to the current customer MD 760 location, and in particular to the access point location of customer MD 760. Thus, any redemption of any relevant coupons from coupons platform 1335, accumulation/redemption or loyalty discounts from loyalty platform 1334 are retrieved by customer wallet functionality 1331. Similarly, information regarding payment options for the identified access point 660 is determined, and the relevance to the customer's wallet is retrieved from customer wallet functionality 1331. Any relevant coupons retrieved from customer wallet 1331 and/or coupons platform 1335 are optionally validated by the issuer before presenting them to the Check Out Wallet (CHOW). In stage 3030 CHOW information is generated by TS 710 and transmitted to customer MD 760. Advantageously, the CHOW information is location relevant, exhibiting only offers, discounts or payment options relevant to the current merchant where customer MD 760 is located.

In an optional portion of stage 3040, a user of customer MD 760 may modify the received CHOW, particularly selecting from among various payment options and/or agreeing to utilize one or more benefits offered. The CHOW information is approved, or optionally modified, and the confirmation with optional modifications are transmitted to TS 710.

In stage 3050, TS 710, responsive to the received CHOW based selections, or simple CHOW approval, of stage 3040, generates a cap financial transaction request from an issuer within customer's payment resources 750. The cap financial request preferably comprises the above mentioned ID1, the initially generated PRN, an identifier of the selected payment method of the approved CHOW and an identifier of access point 660. The issuer, or other payment resource, calculates a risk parameter, and generates an authorization number. The risk parameter typically comprises a financial transaction limit, below which no further authorization is required.

In stage 3060, responsive to the received authorization number, TS 710 generates a message for transmission to access point 660 comprising: ID1, the PNR, the modified CHOW information and an identifier of the issuer.

When the user associated with customer MD 760 has determined the precise desired transaction, in stage 3070 CE 770 is juxtaposed with access point 660, in a process known as Tap and Go. Access point 660 reads the ID1 and PRN from CE 770 and compares it with the ID1 and PRN received from TS 710. Access point 660 then calculates the amount left to be paid of the transaction. Access point 660 generates an authorization request message with a payment identifier and transmits it to TS 710. Optionally, depending on the time allowed for the Tap and Go, CE 770 similarly obtains identification information, total transaction amount and the payment identifier from access point 660 via RFID or NFC, for use as will be described further below.

The authorization request message generated by access point 660 is transmitted by access point 660 via acquirer's band 690 to acquirer 650, and acquirer 650 transmits an authorization request message to TS 710. The acquirer 650 authorization request message preferably comprises: ID1, the PRN, an identifier of access point 660, any loyalty, coupon, or other discount information to be settled, the generated payment identifier and the amount. In one embodiment, the loyalty and coupon information is transmitted directly to TS 710 from access point 660.

In optional stage 3080, customer MD 760 presents a confirmation message for acceptance by a user, preferably requiring input of a code, such as PIN for authorization. Responsive to an acceptance gesture, and/or code input, customer MD 760 transmits a transaction acceptance message to TS 710 comprising ID1, PRN, read access point 660 identifier, payment identifier read from access point 660 and the amount. In one embodiment, a subset of the above information is transmitted so as not to exceed the time limit of the Tap and Go.

TS 710 thus receives an authorization request message generated by access point 660 and optionally a transaction acceptance message generated by customer MD 760. In optional stage 3090 in the event that the elements of the received authorization request message from access point 660 and transaction acceptance message from MD 760 match, i.e. the messages ID1, PRN, access point 660 identifier, payment ID and amount match, in stage 3100 TS 710 proceeds to compare the transaction amount with the received risk information. In the event that the messages do not match, an error condition is flagged and the transaction is not completed. In the event that stage 3090 is not performed, stage 3100 is performed without relevance thereto.

In the event that in stage 3100 the transaction amount of the transaction acceptance message is less than that approved by the received risk information, in stage 3110 the transaction is authorized by TS 710. The authorization number received from the issuer by TS 710 in stage 3060 is preferably transmitted to access point 660 via acquirer 650 through acquirer band 690. A transaction confirmation message is similarly transmitted by TS 710 to customer payment resources 1350, e.g. to an issuer, preferably comprising ID1, the PRN and the amount for settlement. Any gift, coupon or loyalty information is similarly transmitted to the respective database/server. A transaction approval message is preferably transmitted to MD 760 by TS 710, optionally include further local relevant information, such as promotions by adjacent vendors.

In the event that in stage optional 3090 details of the authorization message do not equal the acceptance message in stage 3110 the transaction is refused. In the event that in stage 3100 the transaction acceptance message exceeds the risk parameters, in stage 3110 the transaction is refused. Optionally, as will be described further below, additional security precautions are taken, to thereby authorize the transaction.

Thus, by the utilization of the server based architecture described herein, location based promotions and transaction completion may be advantageously accomplished.

Figure 5C:
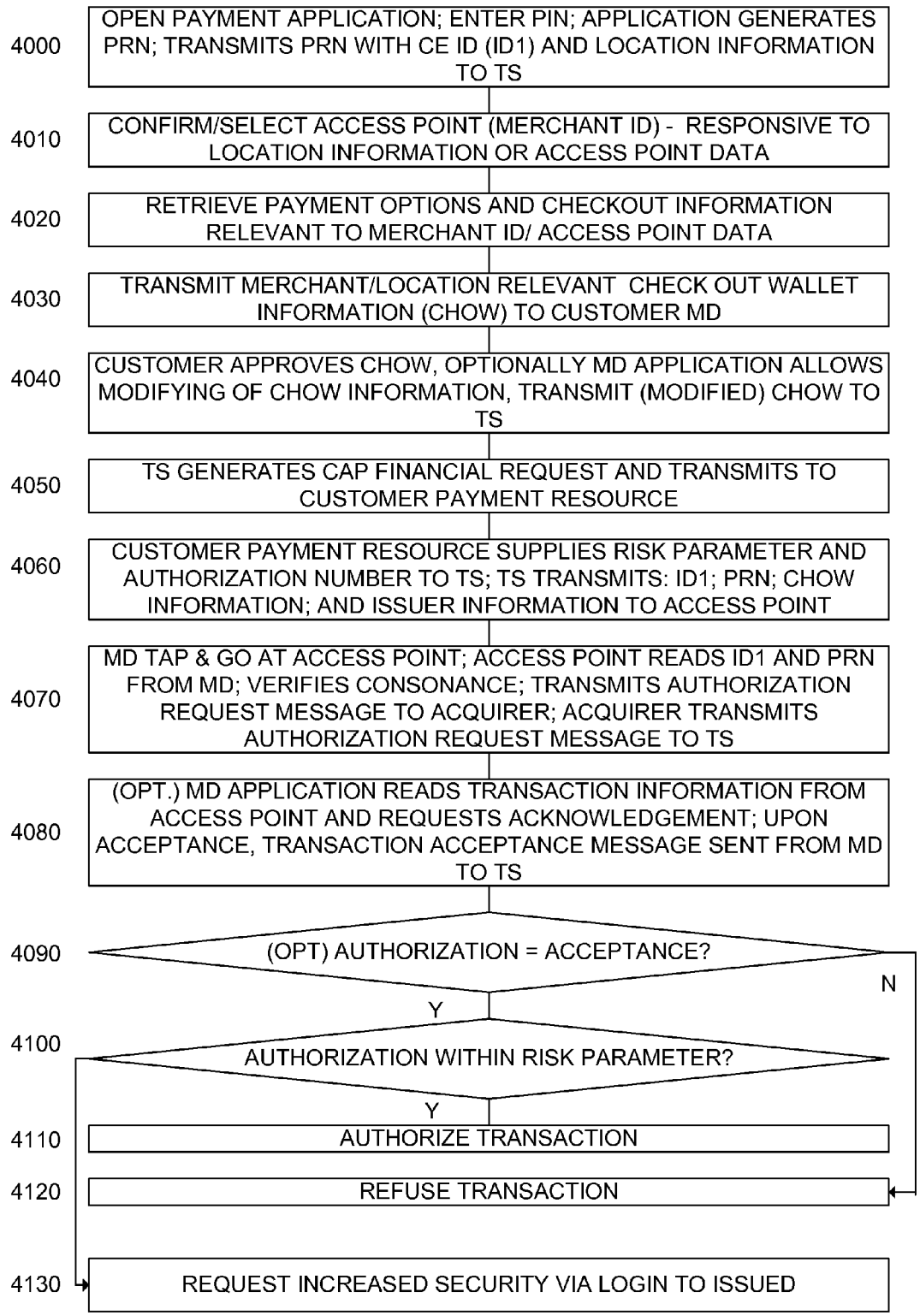
FIG. 5C illustrates a transaction flow utilizing the various domains of FIG. 5A in the absence of an access point poster.

FIG. 5C illustrates a transaction flow utilizing the various domains of FIG. 5A in the absence of access point poster 680, and further requiring an additional authorization in the event that the amount exceeds the received risk information. Thus, the transaction flow is in all respects similar to that of FIG. 5B, described above, except as detailed herein.

In the absence of access point poster 680, location information is in one embodiment supplied responsive to one or both of customer MD 760 GPS electronics or responsive to base station transmission calculations. Thus in stage 4000, a customer opens payment application 765 on customer MD 760 and enters a PIN which has been preregistered with TS 710. MD 760 generates a pseudo-random number (PRN) responsive to a PRN key which was initially loaded at registration, and transmits to TS 710 a readable ID of CE 770, the generated PRN and location information. Location information may be generated by one or both of on board GPS electronics, or responsive to base station transmission calculations. The readable ID of CE 770 may be directly transferred, or an identifier may be utilized without exceeding the scope. The readable ID of CE 770 is denoted ID1 for ease of identification, and is preferably either identical with, or uniquely related to an ID readable from CE 770 as described above in relation to CE 220.

In stage 4010, authentication is performed as described in relation to stages 3005 and 3010, and one or more access points consonant with the location are transmitted to customer MD 760. In the event that a singular access point 660 cannot be determined, a list of possible registered suppliers in the identified area are transmitted to customer MD 760 by TS 710, and a selected supplier is returned to TS 710 by customer MD 760. Similarly, (not shown) refusal occurs in the event that location information for customer MD 760 is not consonant with the location of access point 660. The term consonant is used geographically, to include all potential matches within the accuracy of the location identification equipment, and is thus not meant to be an exact match of pinpoint accuracy.

Operation of stages 4020-4100 are in all respects identical with the operation of stage 3020-3100, respectively, and in the interest of brevity will not be further detailed. In the event that in stage 4090 the transaction acceptance message is not consonant with the acceptance message, in stage 4120 the transaction is refused. In the event that in stage 4110 the transaction acceptance message amount is within the risk parameters, in stage 4120 the transaction authorized as described in relation to stage 3120.

In the event that in stage 4100 the transaction acceptance message amount is greater than that approved by the received risk information, i.e. the transaction amount is greater than the risk parameter, in one embodiment TS 710 requests authorization from the issuer as described above. In another embodiment, in stage 4130 a message is transmitted from TS 710 to customer MD 760, requesting the customer MD 760 log in to the issuer. Customer MD 760 logs into the directed issuer web page and transmits ID1, the PRN, the payment ID and the transaction amount. The issuer web page may authorize the transaction, but typically will require some identification, such as a PIN related to the specific chosen payment ID or other restricted information to reduce the risk. Upon receipt of the additional information, and in the event that the issuer agrees to authorize the transaction, an authorization message including an authorization number, ID1, the PRN, the payment ID and the transaction amount is transmitted directly to TS 710. Transaction approval is finalized as described above in relation to FIG. 5B.

Figure 6B:
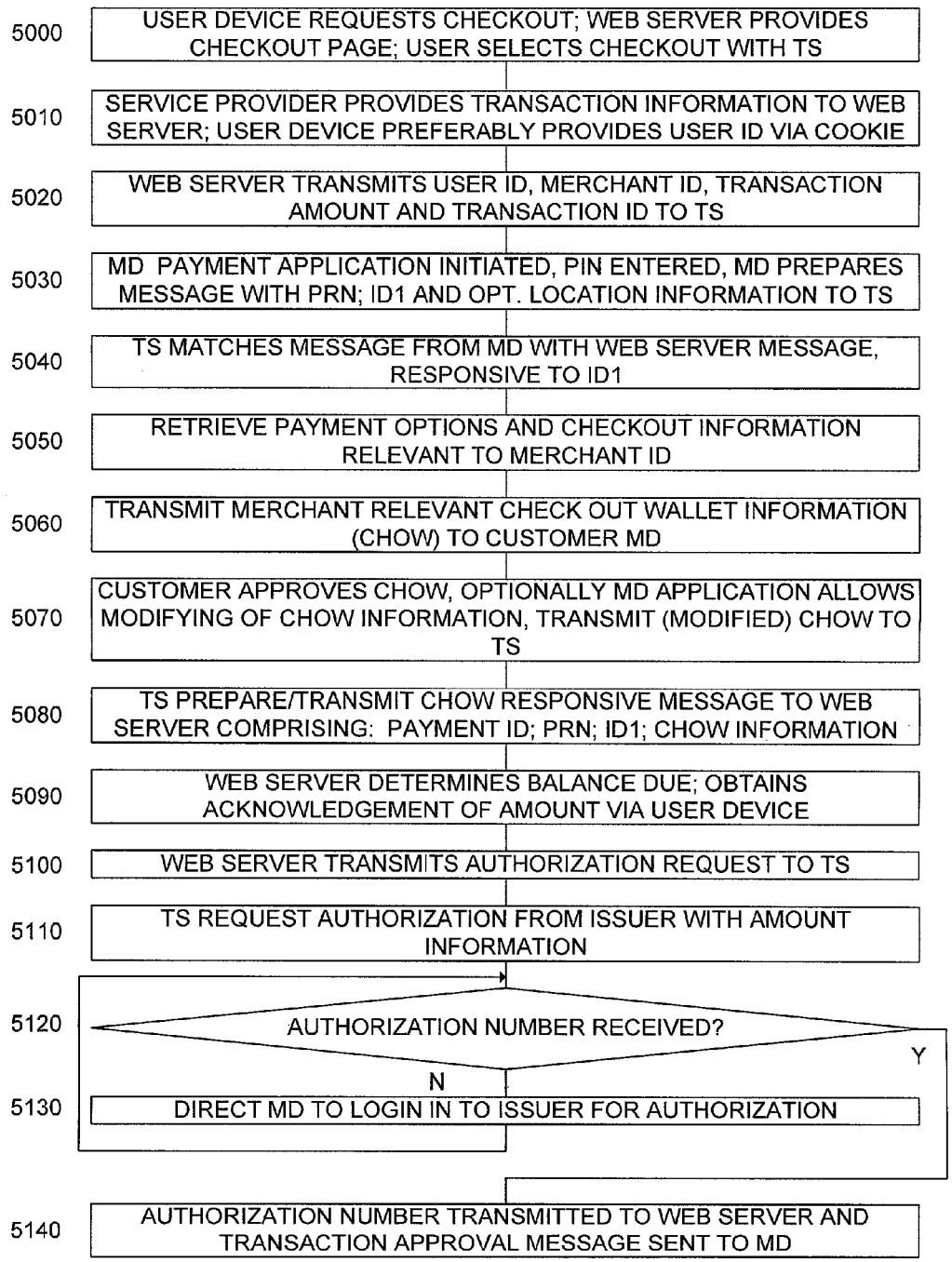
FIG. 6B illustrates a transaction flow utilizing the various domains of FIG. 6A.

FIG. 6A illustrates a high level block diagram of an embodiment of the arrangement of FIG. 5A, wherein access point 660 is replaced by a web server 800 and user device, such as a portable computer 810 is further provided and user device 810 is in communication with web server 800 over a network such as the Internet. FIG. 6B illustrates a transaction flow utilizing the various domains of FIG. 6A, FIGS. 6A and 6B being described herein together for ease of understanding.

In stage 5000, user device 810 is desirous of purchasing a product or service from web based service provider 670 and initiates a checkout request. Web based service provider 670 provides user device 810 with a checkout page. User device 810 selects checkout in cooperation with TS 710 from among the various options, and web based service provider 670 transmits a transaction ID, amount and merchant ID to web server 800. User device 810 preferably provides a user ID stored on a cookie, which has been sent to user device 810 when registered with TS 710, to web server 800.

In stage 50020, Web server 800 transmits a message to TS 710, via acquirer 650, including the obtained user ID, web server or merchant ID (MID), a transaction ID generated by web server 800 and the transaction amount.

In stage 5030, preferably responsive to a user gesture, customer MD 760 is operated by a user to initiate a payment transaction program, and select web based transactions. A PIN or other code preregistered with TS 710 is entered into customer MD 760. MD 760 creates and transmits a message to TS 710 comprising ID1, i.e. a readable identifier of CE 770, a generated PRN and location information.

In one embodiment, location information is generated responsive to one or both of on board GPS electronics and base station transmission calculations. In one embodiment, location information is optional.

In stage 5040, TS 710 matches the received message from customer MD 760 with the received transaction message from web server 800 responsive to consonance of ID1 with the user ID. In one embodiment, the provided user ID is the same as ID1 and in another embodiment the provided user ID is uniquely cross referenced with ID1, i.e. with the readable identifier of CE 770, at a pre-registration stage. In stage 5050, TS 710 retrieves from the various databases 1331-1136, denoted herein as cloud, to determine if any promotions, loyalty benefits, pre-purchase coupons, or gift certificates, without limitation, are relevant to the customer in relation to web server 800.

Similarly, information regarding payment options for the web server 800 is determined, and the relevance to the customer's wallet is retrieved from customer wallet 1331. Any relevant coupons retrieved from coupons platform 1335 may be optionally validated by the issuer. In stage 5060 CHOW information is generated by TS 710 and transmitted to customer MD 760. Advantageously, the CHOW information is relevant to web server 800, exhibiting only offers, discounts or payment options relevant to customer MD 760 in relation to web server 800 and/or service provider 670 and any associated links. In one embodiment, a subset of the CHOW information is transmitted to, and displayed on, user device 810.

In stage 5070, preferably, a user of customer MD 760 may modify the received CHOW, particularly selecting from among various payment options and/or agreeing to utilize one or more benefits offered. The CHOW further comprises the payment amount information as initially received from web server 800 in stage 5020. Any CHOW based selections are transmitted to TS 710 in cooperation with a payment ID.

In stage 5080, TS 710 prepares and transmits a CHOW responsive message for web server 800 comprising the payment ID received from customer MD 760, the PRN generated by customer MD 760, the ID1 of customer MD 760, or a code translatable thereto, and any discount information such as loyalty, coupons and gift card information.

In stage 5090, web server 800, responsive to the received message from TS 710 determines a payment balance for web based service provider 670, and obtains acknowledgement/approval therefrom via user device 810. In stage 5100, web server 800, responsive to the received acknowledgement/approval of stag 5090, transmits an authorization request with a net amount to TS 710.

In stage 5110, TS 710, generates a financial transaction request from an issuer within customer's payment resources 1350, responsive to the payment ID. The financial transaction request preferably comprises the above mentioned ID1, the initially generated PRN, the selected means of payment ID, the MID and the amount. The issuer, or other payment resource, calculates a risk parameter, and if the transaction amount is less than a predetermined risk value generates an authorization number in stage 5120.

In the event that the transaction amount is in excess of the predetermined risk value, in stage 5130, TS 710 communicates with customer MD 760 to direct customer MD 760 to log onto the issuer so as to obtain authorization. Customer MD 760 logs into the directed issuer web page and transmits ID1, the PRN, the means of payment ID and the transaction amount. The issuer web page may authorize the transaction, but typically will require some identification, such as a PIN or other restricted information to reduce the risk. Upon receipt of the additional information, and in the event that the issuer agrees to authorize the transaction, an authorization message including an authorization number, ID1, the PRN, the payment ID and the transaction amount is transmitted directly to TS 710 as described above in relation to sate 5120. The issuer may deny the transaction (not shown) in which case the transaction denial is transmitted to both user MD 760 and web server 800 for display on user device 810.

In stage 5140, the authorization number received by TS 710 is transmitted to web server 800 via acquirer 650 through acquirer band 690. Any gift, coupon or loyalty information is similarly transmitted to the respective database/server. A transaction approval message is transmitted to MD 760 by TS 710, optionally including further local relevant information, such as promotions by adjacent vendors responsive to the initial location information.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to". The term "connected" is not limited to a direct connection, and connection via intermediary devices is specifically included.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. A communication system comprising:
a server configured to be operably coupled to:
   at least one database, and
   a poster communication device that is:
      (1) arranged to communicate with the server across a computer network and
      (2) operably coupled to near field communication (NFC) antenna that is secured at a fixed location on a poster that is arranged to display information,
the NFC antenna:
   (1) being associated with information displayed on the poster and,
   (2) related to content stored at the at least one database,
the server arranged to:
   (1) receive, on a first communication band, from the poster communication device a request from a mobile device for content associated with information displayed on the poster, the request including
      (A) an identifier of a contactless element of a mobile device and
      (B) identification information associated with the NFC antenna,
      in response to the mobile device being placed in proximity to the NFC antenna such that a signal representing the identifier is transmitted from the contactless element via (NFC) to the poster communication device;
   (2) retrieve:
      (A) the content from the at least one database based on the identification information, and
      (B) address information associated with the mobile device based on the identifier; and
   (3) transmit, via a second communication band, the retrieved content associated with the information displayed on the poster to the mobile device based on the retrieved address information and via a pathway not including NFC communication, the poster communication device arranged to not transmit data associated with the information displayed on the poster to the mobile device via NFC in response to the mobile device being placed in proximity to the NFC antenna.

2. The communication system according to claim 1, wherein the identification information associated with the NFC antenna is stored in a memory associated with the NFC antenna.

3. The communication system according to claim 1, wherein the identification information associated with the NFC antenna is stored in a memory associated with the poster communication device.

4. The communication system according to claim 1, wherein the server is configured to receive from the poster communication device loyalty benefit information associated with the NFC antenna.

5. The communication system according to claim 1, wherein the server is arranged to receive, in response to the contactless element being placed in proximity to a provider associated device and from the provider associated device, both (1) an identifier of the provider associated device and (2) the identifier of the contactless element of the mobile device,
the server arranged to transmit, in response to receiving both the identifier of the contactless element of the mobile device and the identifier of the provider associated device, transaction information associated with the contactless element of the mobile device.

6. The communication system according to claim 5, wherein the transaction information includes loyalty benefits associated with the identifier of the contactless element.

7. The communication system according to claim 1, wherein the server is further configured to be in communication with a provider associated device associated with the identification information of associated with the NFC antenna,
the identification information associated with the NFC antenna being associated with a particular provider product,
the server arranged to transmit to the mobile device at least one of payment options or loyalty benefits responsive to the identification information associated with of the NFC antenna.

8. The communication system according to claim 7, wherein the server is arranged to obtain location information for the mobile device, and to compare the obtained location information for the mobile device with location information associated with the identification information of the NFC antenna, the server further arranged to prevent a transaction when the obtained location information for the mobile device is not consonant with the location information associated with the identification information of the NFC antenna.

9. A method of performing a secure transaction, comprising:
receiving, over a first communication band, at a server and in response to a mobile device being placed in proximity to an antenna associated with information displayed on a poster, both an identifier of a contactless element of a mobile device and identification information associated with the antenna, the identifier of the contactless element being received by the antenna via near field communication (NFC);

retrieving content, at the server, from a database storing the content related to the information displayed on the poster, and based on the antenna identification information;
retrieving at the server, address information associated with the mobile device based on the identifier of the contactless element of the mobile device; and
transmitting, by the server and on a second communication band, the content to the mobile device based on the address information and via a pathway (1) not including the poster communication device and (2) not including NFC, the mobile device not receiving any content related to the information displayed on the poster via NFC with the poster.

10. The method according to claim 9, further comprising:
transmitting loyalty benefit information to the mobile device, the loyalty benefit information being associated with both the information displayed on the poster and the content stored at the database.

11. The method according to claim 9, further comprising:
transmitting to the mobile device, via the second communication band, loyalty benefit information associated with the antenna.

12. The method according to claim 9, further comprising:
reading the identifier of the mobile device contactless element when the contactless element is placed in proximity with a provider associated device;
receiving from the provider associated device both the identifier of the mobile device contactless element and an identifier of the provider associated device in response to the provider associated device being placed in proximity with the contactless element; and
transmitting on the second communication band to the mobile device transaction information in response to the receiving both the identifier of contactless element and the identifier of the provider associated device.

13. The method according to claim 12, wherein the transmitted transaction information includes loyalty benefits associated with the identifier of the contactless element identifier.

14. The method according to claim 9, further comprising:
obtaining location information of the mobile device;
comparing the location information of the mobile device with location information associated with the information displayed on the poster; and
preventing a transaction when the location information of the mobile device is not consonant with the location information associated with the information displayed on the poster.

15. A communication system comprising:
a poster communication device configured to communicate with a server across a computer network; and
a first antenna secured in a first region of a poster platform, and a second antenna secured in a second region of the poster platform, the poster communication device operably coupled to the first antenna and the second antenna,
the first antenna arranged to receive via near field communication (NFC) a first signal from a contactless element of a mobile device, the first antenna being identifiable by first identification information and is associated with first information located in the first region of the poster platform, the first information being related to first content stored at a first database,
the second antenna arranged to receive via NFC a second signal from the contactless element of the mobile device, the second antenna being identifiable by second identification information and is associated with the second information located in the second region of the poster platform, the second information being related to second content stored at the first database, the poster communication device arranged to read an identifier from the contactless element of the mobile device placed in proximity with the first antenna, and transmit, on a first communication band, the identifier and the first identification information to the server such that the server retrieves (1) the first content from the first database based on the first identification information, and (2) address information associated with the mobile device based on the identifier, and transmits via a second communication band the retrieved first content to the mobile device based on the retrieved address information and via a pathway not including the poster communication device, the poster communication device arranged to read an identifier from the contactless element of the mobile device placed in proximity with the second antenna, and transmit, on the first communication band, the identifier and the second identification information to the server such that the server retrieves (1) the second content from the second database based on the second identification information, and (2) the retrieved address information associated with the mobile device based on the identifier, and transmits via the second communication band the retrieved second content to the mobile device based on the retrieved address information and via the pathway not including the poster communication device, the mobile device not receiving any content related to information displayed on the poster via NFC communication with the poster.

16. The communication system of claim 15, wherein the first identification information is stored in a memory associated with the first antenna.

17. The communication system of claim 15, wherein the first identification information is stored in a memory associated with the poster communication device.

18. The communication system of claim 15, wherein the server is further configured to be in communication with a provider associated device having an identifier and arranged to:

detect the identifier of the contactless element when the contactless element is in proximity to the provider associated device; and transmit, via the first communication band, the detected identifier of the contactless element and the identifier of the provider associated device to the server, the server arranged to transmit, via the second communication band, transaction information associated with the contactless element to the mobile device in response to receiving the identifier of the contactless element and the identifier of the provider associated device.

19. The communication system of claim 15, wherein the first database and the second database are a single database.

* * * * *

UNITED STATES PATENT AND TRADEMARK OFFICE
CERTIFICATE OF CORRECTION

PATENT NO. : 9,830,594 B2
APPLICATION NO. : 14/118232
DATED : November 28, 2017
INVENTOR(S) : Avish Jacob Weiner Page 1 of 1

It is certified that error appears in the above-identified patent and that said Letters Patent is hereby corrected as shown below:

Column 18, Line 37 (Claim 1, Line 7):
"(2) operably coupled to near field communication" should be -- (2) operably coupled to a near field communication --

Column 19, Line 36 (Claim 7, Line 4):
"identification information of associated with the NFC" should be -- identification information associated with the NFC --

Column 19, Line 43 (Claim 7, Line 11):
"sive to the identification information associated with of" should be -- sive to the identification information associated with --

Signed and Sealed this
Fourth Day of September, 2018

Andrei Iancu
*Director of the United States Patent and Trademark Office*